US010185965B2

(12) United States Patent
Matsumoto et al.

(10) Patent No.: US 10,185,965 B2
(45) Date of Patent: Jan. 22, 2019

(54) STAY DURATION MEASUREMENT METHOD AND SYSTEM FOR MEASURING MOVING OBJECTS IN A SURVEILLANCE AREA

(71) Applicant: PANASONIC CORPORATION, Osaka (JP)

(72) Inventors: Yuichi Matsumoto, Kanagawa (JP); Hiroaki Yoshio, Kanagawa (JP); Youichi Gouda, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 570 days.

(21) Appl. No.: 14/496,051

(22) Filed: Sep. 25, 2014

(65) Prior Publication Data
US 2015/0095107 A1 Apr. 2, 2015

(30) Foreign Application Priority Data

Sep. 27, 2013 (JP) ................................ 2013-201007

(51) Int. Cl.
*G06Q 30/02* (2012.01)
*G06Q 10/04* (2012.01)
*G06K 9/00* (2006.01)

(52) U.S. Cl.
CPC ..... *G06Q 30/0201* (2013.01); *G06K 9/00771* (2013.01); *G06Q 10/04* (2013.01); *G06Q 30/02* (2013.01)

(58) Field of Classification Search
None
See application file for complete search history.

(56) References Cited

U.S. PATENT DOCUMENTS 5,987,154 A * 11/1999 Gibbon .............. G06K 9/00261
382/115
6,195,121 B1 * 2/2001 Huang ............... G06K 9/00228
348/144
(Continued)

FOREIGN PATENT DOCUMENTS

JP 2004-348618 12/2004
WO WO-2006052545 A2 * 5/2006 ............. G05B 15/02
(Continued)

OTHER PUBLICATIONS

Wu, Bo, and Ram Nevatia. "Detection and tracking of multiple, partially occluded humans by bayesian combination of edgelet based part detectors." International Journal of Computer Vision 75.2 (2007): 247-266.*

(Continued)

*Primary Examiner* — Thomas L Mansfield
*Assistant Examiner* — Derick J Holzmacher
(74) *Attorney, Agent, or Firm* — Greenblum & Bernstein, P.L.C.

(57) ABSTRACT

A stay duration measurement device for measuring a stay duration in a measurement area for each moving object, includes: a movement line obtaining unit that obtains a movement line of each moving object detected from images including the measurement area; a movement line assessment unit that determines whether the movement line obtained by the movement line obtaining unit includes a missing part in the measurement area; and a stay duration obtaining unit that, in a case where it is determined by the movement line assessment unit that the movement line of a moving object of interest includes a missing part in the measurement area, obtains a stay duration compensated for the missing part based on a time period(s) required for (Continued)

movement(s) of one or more other moving objects in the measurement area.

15 Claims, 18 Drawing Sheets

(56) References Cited

U.S. PATENT DOCUMENTS

| | | | | |
|---|---|---|---|---|
| 6,697,104 | B1* | 2/2004 | Yakobi | G06K 9/00778 348/143 |
| 6,947,594 | B2* | 9/2005 | Watanabe | G06T 5/004 382/164 |
| 7,003,136 | B1* | 2/2006 | Harville | G06K 9/00201 348/169 |
| 7,319,479 | B1* | 1/2008 | Crabtree | G01S 5/16 348/169 |
| 7,930,204 | B1* | 4/2011 | Sharma | G06Q 30/02 705/7.32 |
| 7,983,448 | B1* | 7/2011 | da Vitoria Lobo | G06K 9/00355 382/103 |
| 8,009,863 | B1* | 8/2011 | Sharma | G06K 9/00335 348/159 |
| 8,098,888 | B1* | 1/2012 | Mummareddy | G06K 9/00778 382/103 |
| 8,570,373 | B2* | 10/2013 | Variyath | G01S 5/02 348/143 |
| 8,570,376 | B1* | 10/2013 | Sharma | H04N 7/18 348/159 |
| 8,599,267 | B2* | 12/2013 | Kuwano | G06K 9/00228 348/135 |
| 8,724,879 | B2* | 5/2014 | Uebayashi | A61B 6/5258 128/922 |
| 2003/0190058 | A1* | 10/2003 | Jun | G06K 9/3241 382/104 |
| 2005/0117778 | A1* | 6/2005 | Crabtree | G06K 9/00771 382/103 |
| 2007/0003141 | A1* | 1/2007 | Rittscher | G06K 9/00778 382/181 |
| 2007/0013776 | A1* | 1/2007 | Venetianer | G06K 9/00771 348/143 |
| 2007/0127774 | A1* | 6/2007 | Zhang | G06K 9/00771 382/103 |
| 2007/0160289 | A1* | 7/2007 | Lipton | G06K 9/00771 382/173 |
| 2007/0182818 | A1* | 8/2007 | Buehler | G08B 13/19602 348/143 |
| 2007/0188619 | A1* | 8/2007 | Kurata | H04N 5/145 348/208.99 |
| 2007/0253595 | A1* | 11/2007 | Sorensen | G07C 9/00 382/103 |
| 2007/0257985 | A1* | 11/2007 | Estevez | G06K 9/00369 348/143 |
| 2007/0282665 | A1* | 12/2007 | Buehler | G06Q 30/02 705/7.29 |
| 2008/0018738 | A1* | 1/2008 | Lipton | G06K 9/00771 348/143 |
| 2008/0074496 | A1* | 3/2008 | Venetianer | G06K 9/00335 348/150 |
| 2008/0215462 | A1* | 9/2008 | Sorensen | G06K 9/00771 705/28 |
| 2008/0285802 | A1* | 11/2008 | Bramblet | G07C 9/00 382/103 |
| 2008/0312871 | A1* | 12/2008 | Salcedo | G05B 15/02 702/179 |
| 2009/0003653 | A1* | 1/2009 | Takahata | G06T 7/2093 382/103 |
| 2009/0034797 | A1* | 2/2009 | Senior | G06K 9/00785 382/104 |
| 2009/0041297 | A1* | 2/2009 | Zhang | G06K 9/00362 382/103 |
| 2009/0297023 | A1* | 12/2009 | Lipton | G06K 9/00771 382/164 |
| 2010/0004997 | A1* | 1/2010 | Mehta | G06Q 30/02 705/14.66 |
| 2010/0013931 | A1* | 1/2010 | Golan | G06K 9/00771 348/150 |
| 2010/0157062 | A1* | 6/2010 | Baba | G07C 9/00111 348/156 |
| 2010/0231526 | A1* | 9/2010 | Kawabata | A63F 13/00 345/173 |
| 2011/0085702 | A1* | 4/2011 | Nevatia | G06K 9/00771 382/103 |
| 2011/0169917 | A1* | 7/2011 | Stephen | G06T 7/2033 348/46 |
| 2011/0175738 | A1* | 7/2011 | Baumann | G08B 13/19608 340/584 |
| 2012/0203732 | A1* | 8/2012 | Oono | G01C 21/20 706/59 |
| 2012/0207350 | A1* | 8/2012 | Loos | G06K 9/00778 382/103 |
| 2012/0310737 | A1* | 12/2012 | Song | G06Q 30/0261 705/14.57 |
| 2013/0041573 | A1* | 2/2013 | Ochi | G01S 13/345 701/117 |
| 2013/0072798 | A1* | 3/2013 | Tateyama | A61B 8/14 600/444 |
| 2013/0182114 | A1* | 7/2013 | Zhang | H04N 7/18 348/150 |
| 2013/0197890 | A1* | 8/2013 | Ide | G01C 21/3484 703/6 |
| 2013/0215270 | A1* | 8/2013 | Murashita | B60R 1/00 348/148 |
| 2013/0223673 | A1* | 8/2013 | Davis | G06K 9/78 382/100 |
| 2013/0242095 | A1* | 9/2013 | Lipton | G06K 9/00771 348/143 |
| 2014/0063263 | A1* | 3/2014 | Bernal | H04N 5/23296 348/169 |
| 2014/0079282 | A1* | 3/2014 | Marcheselli | G06K 9/00335 382/103 |
| 2014/0195144 | A1* | 7/2014 | Morikawa | G01C 21/3679 701/400 |
| 2015/0015704 | A1* | 1/2015 | Hirasawa | G06T 7/2093 348/143 |
| 2015/0015718 | A1* | 1/2015 | Fujimatsu | G06K 9/00771 348/159 |
| 2015/0016798 | A1* | 1/2015 | Fujimatsu | G06K 9/00362 386/223 |
| 2015/0134418 | A1* | 5/2015 | Leow | G06Q 30/0205 705/7.34 |
| 2015/0235237 | A1* | 8/2015 | Shaw | G06C 30/0201 705/7.29 |
| 2015/0310274 | A1* | 10/2015 | Shreve | G06K 9/00624 382/103 |
| 2015/0310459 | A1* | 10/2015 | Bernal | G06Q 30/0201 705/7.29 |
| 2015/0317797 | A1* | 11/2015 | Lu | G06T 7/0081 382/103 |
| 2016/0180173 | A1* | 6/2016 | Westmacott | G06K 9/00765 382/103 |

FOREIGN PATENT DOCUMENTS

| | | | | |
|---|---|---|---|---|
| WO | WO-2007030168 A1 * | 3/2007 | | G08B 13/19602 |
| WO | WO-2007086926 A2 * | 8/2007 | | G06K 9/00362 |
| WO | WO 2008016672 A2 * | 2/2008 | | H04N 5/23206 |
| WO | WO-2012066951 A1 * | 5/2012 | | G01C 21/3484 |

OTHER PUBLICATIONS

Hu, Weiming, et al. "A survey on visual surveillance of object motion and behaviors." IEEE Transactions on Systems, Man, and Cybernetics, Part C (Applications and Reviews) 34.3 (2004): 334-352. (Year: 2004).*

(56) References Cited

OTHER PUBLICATIONS

Onoguchi, Kazunori. "Shadow elimination method for moving object detection." Pattern Recognition, 1998. Proceedings. Fourteenth International Conference on. vol. 1. IEEE, 1998. (Year: 1998).*
Collins, Robert T., et al. "A system for video surveillance and monitoring." VSAM final report (2000): 1-68. (Year: 2000).*
Reilly, Vladimir, Haroon Idrees, and Mubarak Shah. "Detection and tracking of large number of targets in wide area surveillance." European conference on computer vision. Springer, Berlin, Heidelberg, 2010. (Year: 2010).*
Javed, Omar, and Mubarak Shah. "Tracking and object classification for automated surveillance." European Conference on Computer Vision. Springer, Berlin, Heidelberg, 2002. (Year: 2002).*
Heikkila, Marko, and Matti Pietikainen. "A texture-based method for modeling the background and detecting moving objects." IEEE transactions on pattern analysis and machine intelligence 28.4 (2006): 657-662. (Year: 2006).*
B. Leibe et al., "Coupled Detection and Trajectory Estimation for Multi-Object Tracking", ICCV 2007. IEEE 11th International Conference on Computer Vision, IEEE, PI, XP031194425, Oct. 1, 2007, pp. 1-8.
Extended Search report from E.P.O., dated Feb. 12, 2015.

* cited by examiner

Fig.4

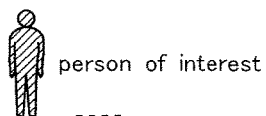
person of interest

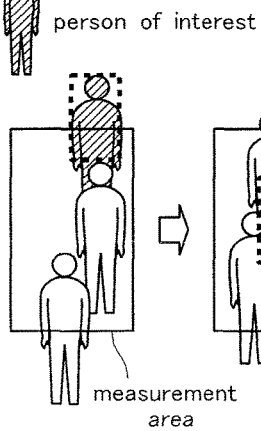
measurement area
(A-1)

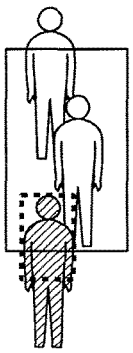
normal pattern

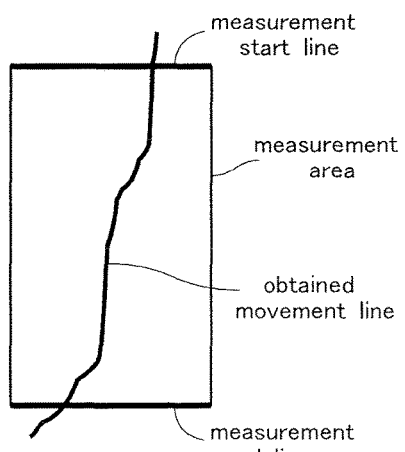
measurement start line
measurement area
obtained movement line
measurement end line
(A-2)

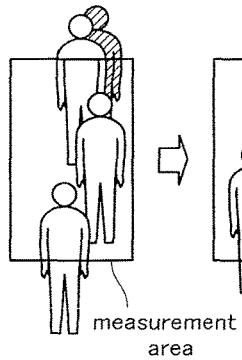
measurement area
(B-1)

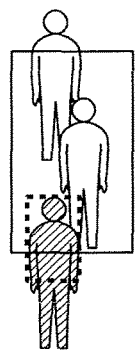
appearing pattern

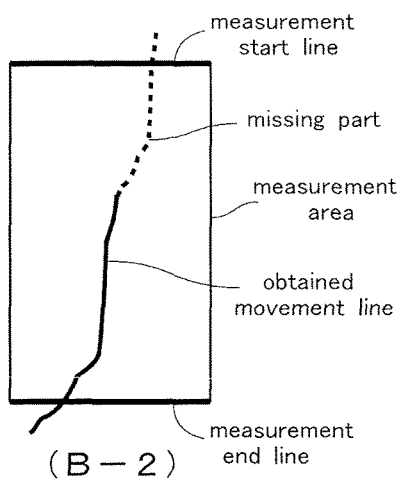
measurement start line
missing part
measurement area
obtained movement line
measurement end line
(B-2)

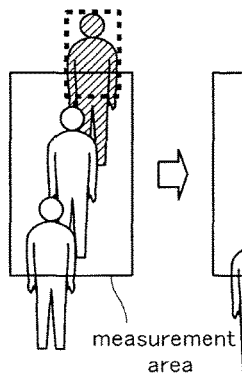
measurement area
(C-1)

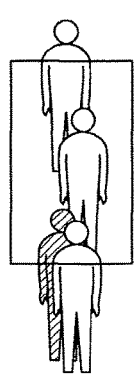
disappearing pattern

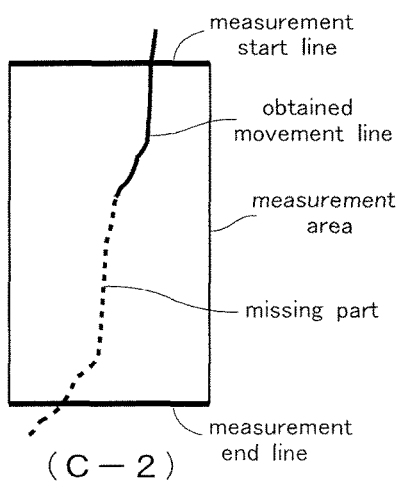
measurement start line
obtained movement line
measurement area
missing part
measurement end line
(C-2)

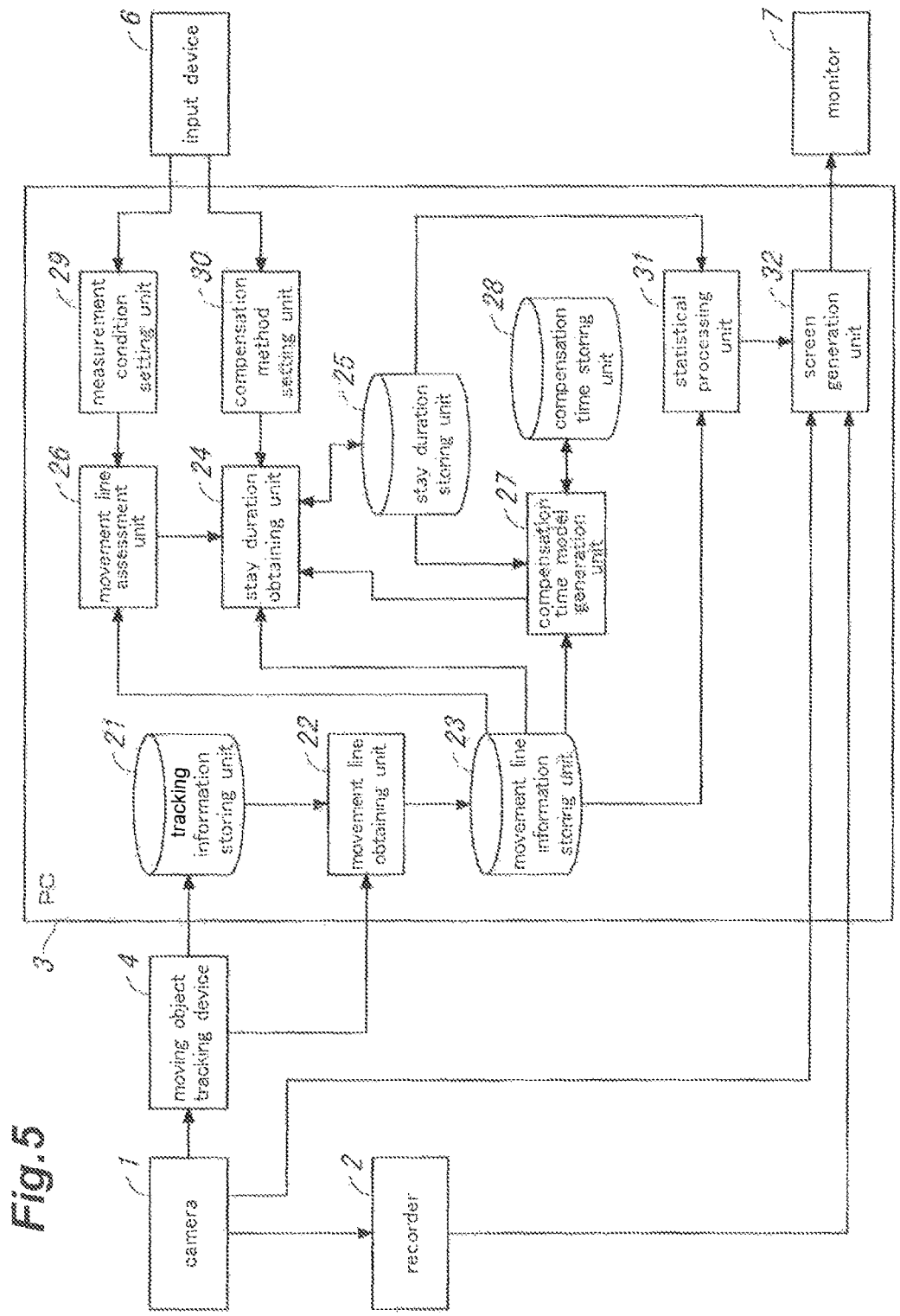

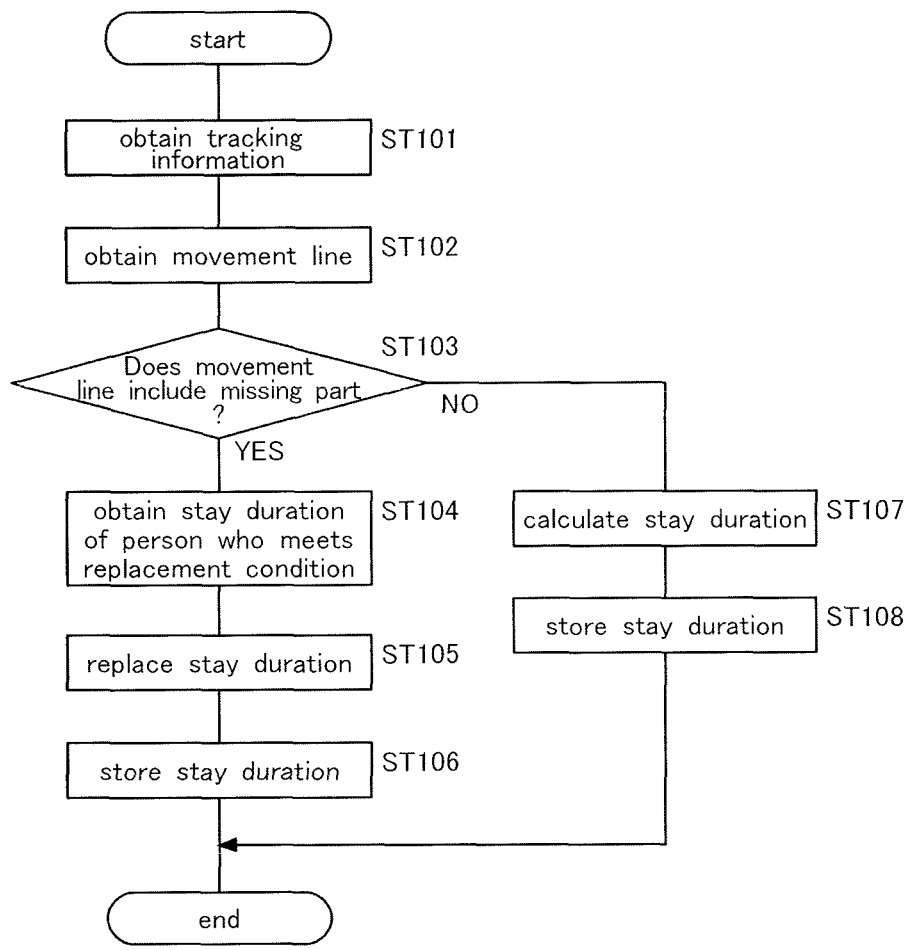

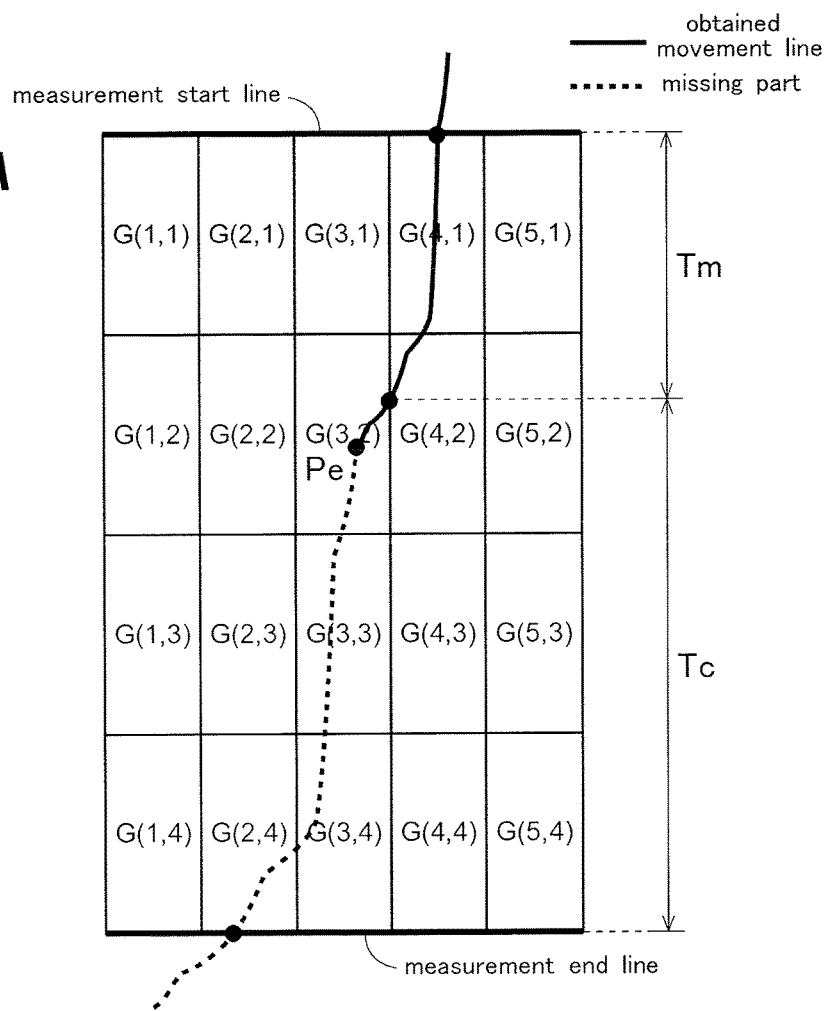

Fig.13

| measurement area | number of staying persons | stay duration | degree of reliability |
|---|---|---|---|
| A | 4 | 5min | 60% |
| B | 2 | 1min | 90% |
| C | 8 | 10min | 40% |
| D | 3 | 4min | 80% |

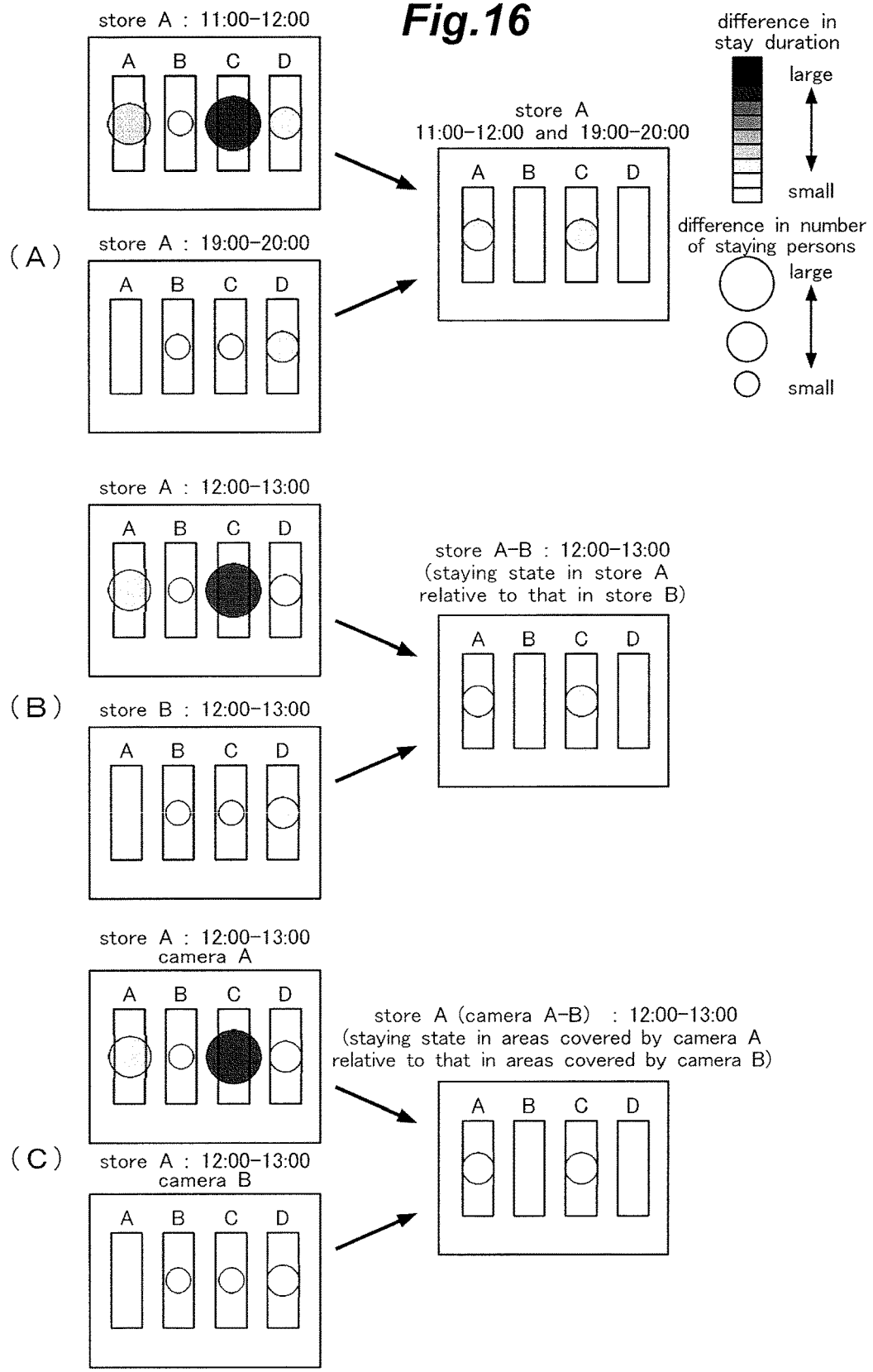

Fig.18
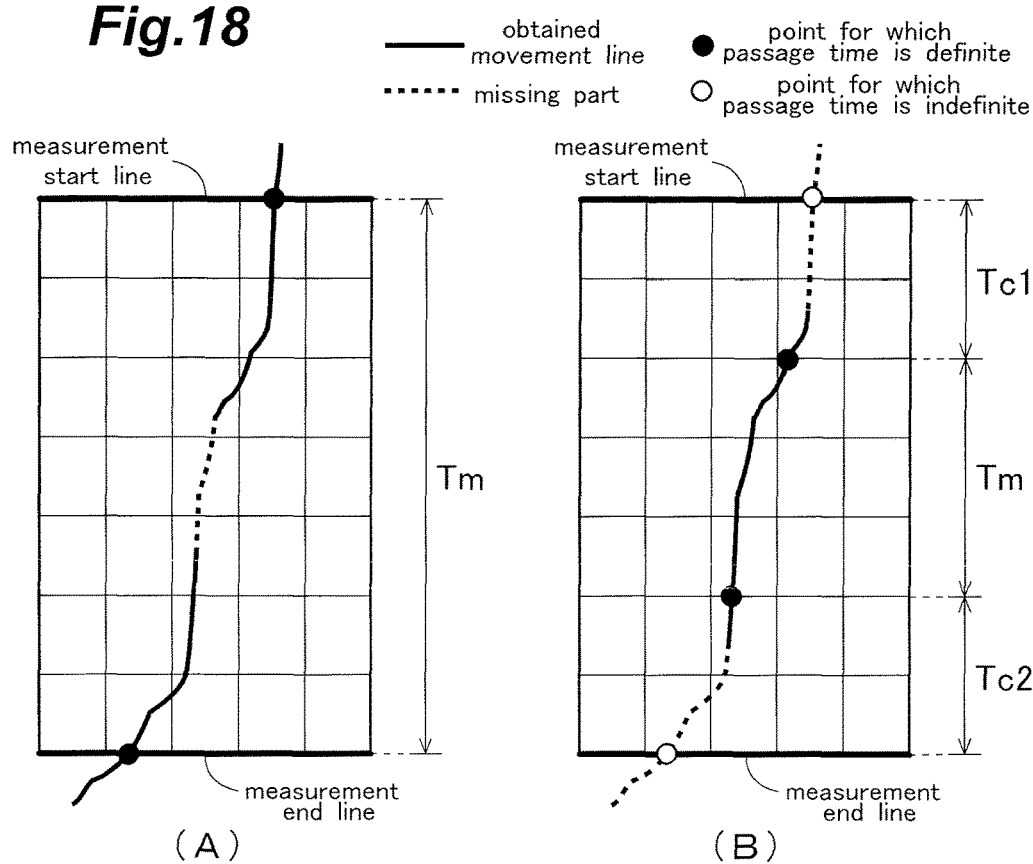
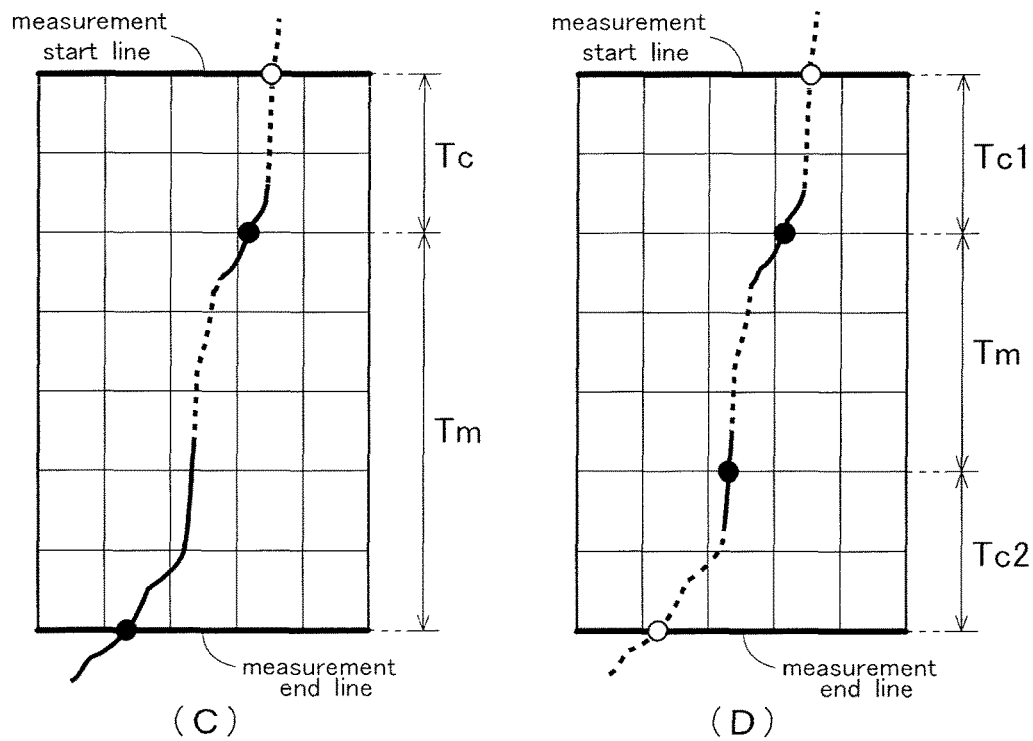

us 10,185,965 B2

STAY DURATION MEASUREMENT METHOD AND SYSTEM FOR MEASURING MOVING OBJECTS IN A SURVEILLANCE AREA

TECHNICAL FIELD

The present invention relates to a stay duration measurement device, a stay duration measurement system and a stay duration measurement method for measuring a stay duration in a measurement area for each moving object such as a person.

BACKGROUND OF THE INVENTION

In a commercial establishment such as a retail store, a queue (line) of customers may be formed at the checkout counter when the number of customers who want to pay for their purchases increases to a certain point, and this necessitates the customers to wait in the queue for their turn. If the wait time of the customers in the queue, i.e., the period of time from when each customer joins the queue until when checkout is completed, can be grasped, it is possible to develop measures for improving the operation of the store based on the wait time, to thereby improve the customer satisfaction and streamline the operation of the commercial establishment.

To obtain the wait time of the customers, it may be conceived to capture a video image with a camera to cover the place where a queue of customers may be formed, set a measurement area so as to correspond to a region in the captured image where a queue of customers may be formed, and measure a stay duration of each customer in the measurement area, namely, a period of time from when each customer enters the measurement area to when the customer exits the measurement area. As a technology relating to such measurement of stay duration, it is known to analyze the information of multiple image frames comprehensively to track the movement path of each customer, namely, to obtain a movement line (movement trajectory) representing the path taken by each customer, and based on the movement line, calculate the stay duration of each customer in an area of interest (see JP2004-348618A).

In a state where a queue of multiple persons is formed, some of the persons may overlap each other along the line of sight of the camera so that a "background" person may be blocked from view. This phenomenon is known as occlusion. If occlusions occur, the accuracy of person detection decreases and the movement lines in the measurement area may become incomplete. Namely, the movement lines may include a missing part in the measurement area. In such a case, if stay durations are measured based on the movement lines, accurate stay durations may not be obtained. The aforementioned conventional technology takes no measure to address this problem.

It may be conceived to remove a movement line from measurement if the movement line is incomplete in the measurement area. In this way, it is possible to avoid assessing the staying state (queue property) based on inaccurate stay durations. However, the assessment of the staying state is important particularly when the store is crowded with customers, and under such crowded condition, occlusion of one customer by another tends to occur frequently and a larger number of movement lines tend to become incomplete in the measurement area. Therefore, if movement lines are removed from measurement for the reason that they are incomplete in the measurement area, it is not possible to accurately grasp the staying state under crowded condition. Thus, it is desired to provide an appropriate compensation process which makes it possible to obtain, even for a person (customer) whose movement line in the measurement area is incomplete, a stay duration comparable to that which would be obtained if the movement line in the measurement area were complete.

The present invention is made to solve the aforementioned problems in the prior art, and a primary object of the present invention is to provide a stay duration measurement device, a stay duration measurement system and a stay duration measurement method configured to be able to obtain, even for a moving object whose movement line in a measurement area is incomplete, a stay duration comparable to that which would be obtained if the movement line in the measurement area were complete.

SUMMARY OF THE INVENTION

To achieve the foregoing object, a first aspect of the present invention provides a stay duration measurement device for measuring a stay duration in a measurement area for each moving object, including: a movement line obtaining unit that obtains a movement line of each moving object detected from images including the measurement area; a movement line assessment unit that determines whether the movement line obtained by the movement line obtaining unit includes a missing part in the measurement area; and a stay duration obtaining unit that, in a case where it is determined by the movement line assessment unit that the movement line of a moving object of interest includes a missing part in the measurement area, obtains a stay duration compensated for the missing part based on a time period(s) required for movement(s) of one or more other moving objects in the measurement area.

According to this structure, it is possible to obtain, even for a moving object whose movement line in a measurement area is incomplete, a stay duration comparable to that which would be obtained if the movement line in the measurement area were complete. Therefore, it is possible to obtain a stay duration without a significant error for every moving object detected, and hence, to grasp the staying state correctly under crowded condition where it is particularly important to grasp the staying state.

In a second aspect of the present invention, the movement line assessment unit determines that the movement line includes a missing part in the measurement area when the movement line crosses only one or neither of a measurement start line and a measurement end line defined on a boundary of the measurement area.

According to this structure, a determination of whether a movement line includes a missing part in the measurement area can be made by merely determining whether the movement line crosses each of the measurement start line and the measurement end line, and thus, the determination can be made easily.

In a third aspect of the present invention, the stay duration measurement device further includes a learning model generation unit that collects time periods required for movements of multiple moving objects in the measurement area, and generates a learning model in which compensation times are set such that a compensation time for a missing part in a movement line is determined based on a position of the missing part, wherein the stay duration obtaining unit obtains, according to the learning model, a compensation time based on the position of the missing part in the movement line of the moving object of interest, and obtains a stay duration compensated for the missing part by use of the obtained compensation time.

According to this structure, a learning model that sets compensation times to compensate for missing parts in movement lines is generated, and a compensation time for a missing part in a particular movement line is obtained based on the learning model, and thus, it is possible to obtain a highly accurate stay duration.

In a forth aspect of the present invention, the movement line assessment unit determines whether the movement line is in an appearing pattern in which the movement line appears within the measurement area; the learning model generation unit generates a learning model for the appearing pattern in which time periods required for entry into the measurement area to reaching various positions in the measurement area are set as the compensation times; and when it is determined by the movement line assessment unit that the movement line is in the appearing pattern, the stay duration obtaining unit obtains, according to the learning model for the appearing pattern, the compensation time based on a position of a start point of the movement line.

According to this structure, it is possible to obtain the compensation time easily and with high accuracy in the case of the appearing pattern in which a movement line appears within a measurement area.

In a fifth aspect of the present invention, the movement line assessment unit determines whether the movement line is in a disappearing pattern in which a movement line disappears within the measurement area; the learning model generation unit generates a learning model for the disappearing pattern in which time periods required to move from various positions in the measurement area to exit the measurement area are set as the compensation times; and when it is determined by the movement line assessment unit that the movement line is in the disappearing pattern, the stay duration obtaining unit obtains, according to the learning model for the disappearing pattern, the compensation time based on a position of an end point of the movement line.

According to this structure, it is possible to obtain the compensation time easily and with high accuracy in the case of the disappearing pattern in which a movement line disappears within a measurement area.

In a sixth aspect of the present invention, the measurement area is divided into a plurality of division areas; the learning model generation unit collects time periods required for movements of multiple moving objects in the measurement area on the basis of division areas and generates the learning model such that a compensation time is set for each division area; and the stay duration obtaining unit obtains, according to the learning model, the compensation time based on a position of one or more division areas in which the missing part is present.

According to this structure, the learning model can be generated easily, while the stay duration can be obtained with practically sufficient accuracy.

In a seventh aspect of the present invention, the learning model generation unit generates a learning model for each time slot; and the stay duration obtaining unit obtains the compensation time according to a learning model of a time slot in which the moving object of interest was detected.

According to this structure, a compensation time reflecting the movement situation of moving objects in the measurement area can be obtained, where the movement situation can vary depending on the time slot, and thus, the accuracy of the compensation time obtained can be improved.

In an eighth aspect of the present invention, the stay duration obtaining unit replaces the stay duration of a moving object whose movement line is determined to include a missing part in the measurement area with a stay duration of another moving object whose movement line is determined not to include a missing part in the measurement area.

According to this structure, a stay duration having no or reduced influence of a missing part in a movement line can be obtained by simply replacing the stay duration of the moving object of interest with the stay duration of another moving object, and thus, the process of obtaining the stay duration can be performed easily.

In a ninth aspect of the present invention, the stay duration obtaining unit replaces the stay duration of the moving object whose movement line is determined to include a missing part in the measurement area with a stay duration of a moving object which, of other moving objects whose movement line is determined not to include a missing, part in the measurement area, is temporally closest to the moving object whose movement line is determined to include a missing part.

According to this structure, as the moving object that is temporally closest to the moving object of interest is highly likely to have been in a similar situation to that the moving object of interest was in, and hence, is highly likely to have a stay duration close to that of the moving object of interest, and thus, by replacing the stay duration of the moving object of interest with the stay duration of the temporally closest moving object, it is possible to obtain a highly accurate stay duration.

In a tenth aspect of the present invention, the stay duration measurement device according to claim 1, further includes: a storing unit that cumulatively stores the stay durations obtained for respective moving object by the stay duration obtaining unit; a statistical processing unit that performs temporal statistical processing on the stay durations obtained for the respective moving objects and cumulatively stored in the storing unit to thereby generate statistical information; and an output information generation unit that generates output information including the statistical information.

According to this structure, a user is enabled to grasp a temporal change in the stay duration.

In an eleventh aspect of the present invention, the output information generation unit generates output information relating to a display image in which one or more images representing the statistical information are displayed superimposed on an image including the measurement area.

According to this structure, it is possible to check the staying state of moving objects in the measurement area while comparing it with an actual state of moving objects shown in the image including the measurement area.

In a twelfth aspect of the present invention, in the display image, a magnitude of a numerical value of the statistical information is expressed by at least one of a size, tint and darkness of the image representing the statistical information.

According to this structure, it is possible to grasp the magnitude of the numerical value of the statistical information at a glance. Particularly, by expressing multiple kinds of statistical information with different attributes of an image, a single image can express multiple kinds of statistical information, whereby in a case where one or more images representing statistical information are displayed superimposed on the image including the measurement area, the resulting display screen (display image) can be easier to view.

In a thirteenth aspect of the present invention, the statistical processing unit obtains stay durations for respective unit times as the statistical information based on the stay durations obtained for the respective moving objects; and the output information generation unit generates output information for arranging the stay durations for the respective unit times in chronological order.

According to this structure, the stay durations for the respective unit times are output such that they are arranged in chronological order, and thus, it is possible to grasp the temporal change in the stay duration at a glance and to compare the staying states in different unit times easily.

In a fourteenth aspect of the present invention, the statistical processing unit obtains a difference between sets of statistical information obtained under different conditions; and the output information generation unit generates output information including the difference between the sets of statistical information.

According to this structure, a difference between sets of statistical information obtained under different conditions is output, and thus, it is possible to understand the difference between staying states of moving objects under different conditions at a glance.

In a fifteenth aspect of the present invention, the statistical information includes, in addition to the stay duration, a number of moving objects staying in the measurement area simultaneously.

According to this structure, since a number of moving objects staying in the measurement area simultaneously is output as the statistical information in addition to the stay duration, it is possible to grasp the staying state of the moving objects in the measurement area in more detail.

In a sixteenth aspect of the present invention, there is provided a stay duration measurement system for measuring a stay duration in a measurement area for each moving object, including: a camera that captures images of a region including the measurement area; and a plurality of information processing devices, wherein the plurality of information processing devices jointly include: a moving object detection unit that detects a moving object from the images captured by the camera and outputs detection position information; a movement line obtaining unit that obtains a movement line of each moving object based on the detection position information; a movement line assessment unit that determines whether the movement line obtained by the movement line obtaining unit includes a missing part in the measurement area; and a stay duration obtaining unit that, in a case where it is determined by the movement line assessment unit that the movement line of a moving object of interest includes a missing part in the measurement area, obtains a stay duration compensated for the missing part based on a time period(s) required for movement(s) of one or more other moving objects in the measurement area.

According to this structure, similarly to the structure according to the first aspect of the present invention, it is possible to obtain, even for a moving object whose movement line in a measurement area is incomplete, a stay duration comparable to that which would be obtained if the movement line in the measurement area were complete.

In a seventeenth aspect of the present invention, there is provided a stay duration measurement method for measuring a stay duration in the measurement area for each moving object, including the steps of: obtaining a movement line of each moving object detected from images including the measurement area; determining whether the movement line obtained by the step of obtaining includes a missing part in the measurement area; and in a case where it is determined by the step of determining that the movement line of a moving object of interest includes a missing part in the measurement area, obtaining a stay duration compensated for the missing part based on a time period(s) required for movement(s) of one or more other moving objects in the measurement area.

According to this structure, similarly to the structure according to the first aspect of the present invention, it is possible to obtain, even for a moving object whose movement line in a measurement area is incomplete, a stay duration comparable to that which would be obtained if the movement line in the measurement area were complete.

BRIEF DESCRIPTION OF THE DRAWINGS

Now the present invention is described in the following in terms of preferred embodiments thereof with reference to the appended drawings, in which:

FIG. 4 is an explanatory diagram for explaining various situations of persons and movement lines in a measurement area;

FIG. 5 is a block diagram schematically showing a functional structure of a personal computer (PC) 3;

FIG. 7 is a flowchart showing a process performed by the PC 3 in a case where a stay duration replacement process is selected;

FIGS. 9A and 9B are explanatory diagrams for explaining a process performed by the stay duration obtaining unit 24 in the case of a disappearing pattern in which a movement line disappears within a measurement area;

FIG. 13 is an explanatory diagram for explaining an example in which statistical information is displayed in the form of a table;

FIG. 16 is an explanatory diagram for explaining an example in which a difference between sets of statistical information obtained under different conditions is displayed;

FIG. 18 is an explanatory diagram for explaining other examples in which a movement line has a missing part in a measurement area.

DETAILED DESCRIPTION OF THE PREFERRED EMBODIMENTS

In the following, embodiments of the present invention will be described with reference to the drawings.

Figure 1:
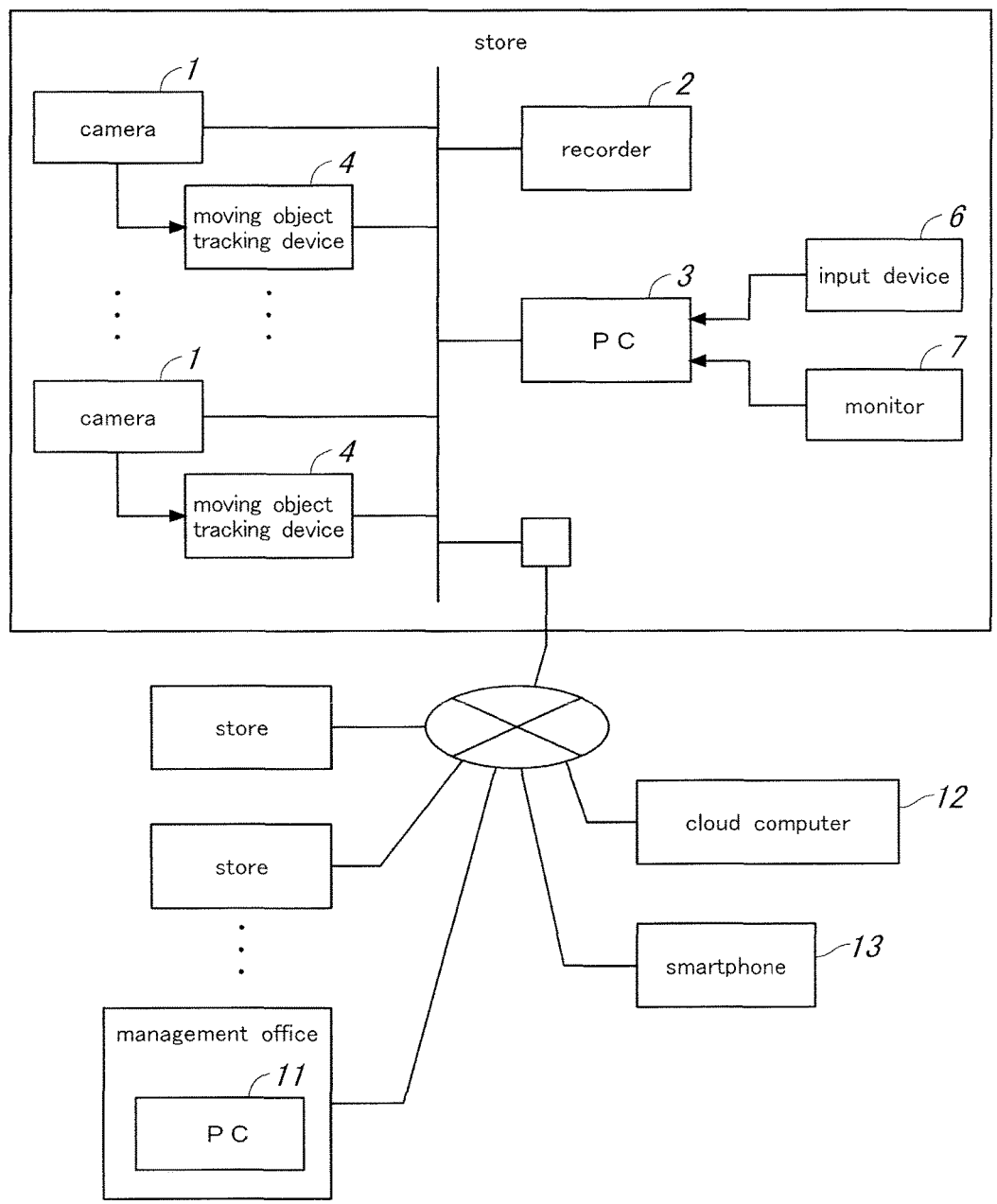
FIG. 1 is a diagram showing an overall configuration of a stay duration measurement system according to an embodiment of the present invention.

FIG. 1 is a diagram showing an overall configuration of a stay duration measurement system according to an embodiment of the present invention. This stay duration measurement system is designed for retail stores such as a supermarket or the like, and includes cameras 1, a recorder (image storing device) 2, a personal computer (PC) (stay duration measurement device) 3 and moving object tracking devices (moving object detection unit) 4.

The cameras 1 are mounted at appropriate positions in a store to capture images of a monitored area in the store, and image information obtained thereby is recorded in the recorder 2.

The PC 3 is connected with an input device 6 such as a mouse for a user such as a monitoring person to perform a variety of input operations, and a monitor (display device) 7 on which a monitoring screen is displayed. It is to be noted that the input device 6 and the monitor 7 may be embodied as a touch panel display.

The PC 3 is set up in a security station or the like of the store, and causes the monitor 7 to display a monitoring screen which enables the monitoring person (such as a security guard) to view the real-time image of an interior of the store taken by the cameras 1 or the past image of the interior of the store recorded in the recorder 2.

A PC 11 installed in a management office is also connected with a monitor not shown in the drawings, such that a user at the management office can check the situation in the store by viewing the real-time image of the interior of the store taken by the cameras 1 or the past image of the interior of the store recorded in the recorder 2.

The moving object tracking devices 4 perform a process of detecting a person(s) (moving object) from the captured images taken by the respective cameras 1 and outputting tracking information (detection position information) for each person. This moving object tracking process may be performed by use of known image recognition technology (person detection technology, person tracking technology, etc.).

Figure 2:
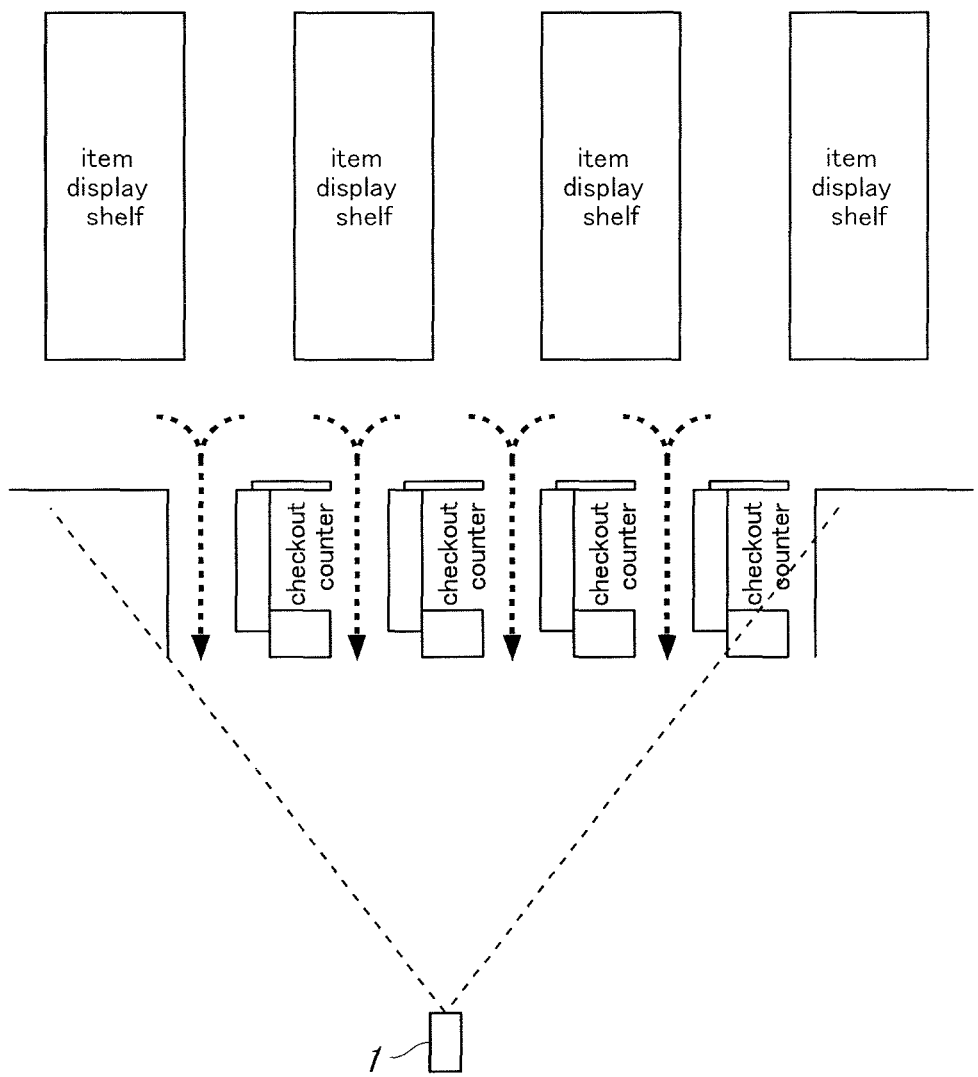
FIG. 2 is a plan view showing an exemplary position of a camera 1 in a store.

FIG. 2 is a plan view showing an exemplary position of a camera 1 in the store. Item display shelves and checkout counters are placed in the store, and the camera 1 is mounted to take images of the checkout counters. Customers pick desired items from the item display shelves and make payment at the checkout counters. The customers approach the checkout counters from an item display area where the item display shelves are arranged, and leave the checkout counters after making payment. The camera 1 takes images of the customers approaching the checkout counters from the front, and based on the images taken by the camera 1, person detection can be performed.

Figure 3:
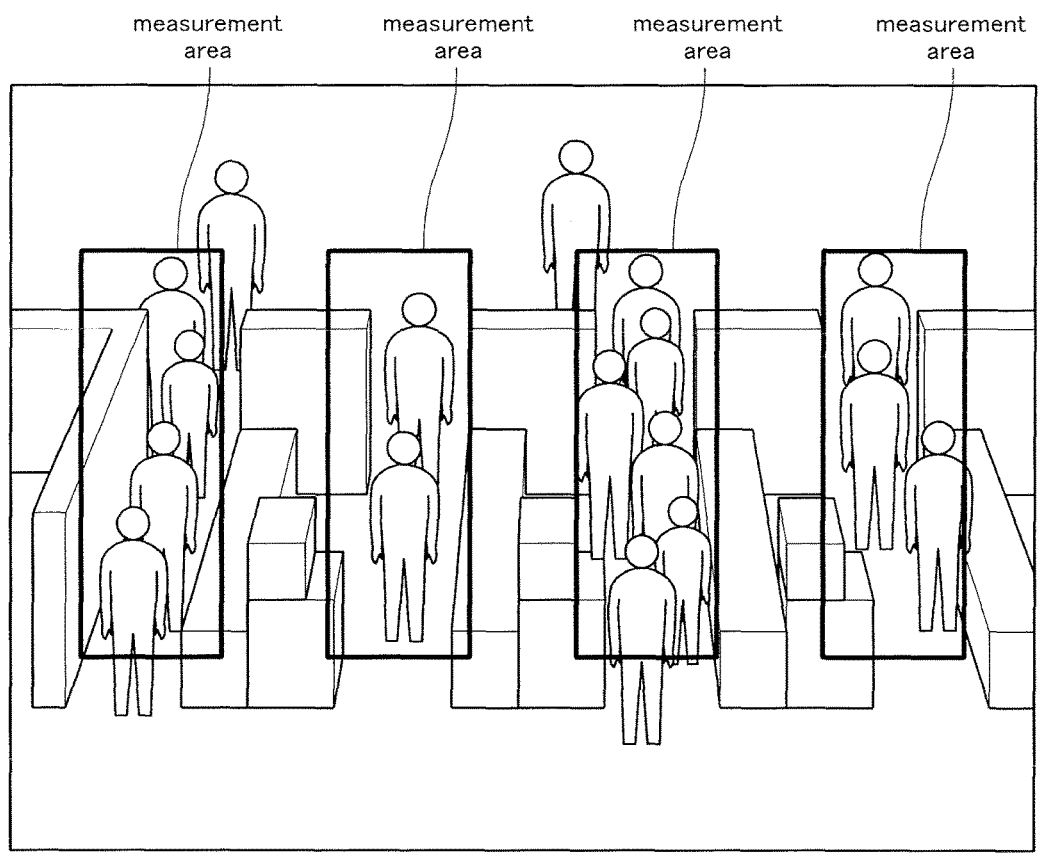
FIG. 3 is an explanatory diagram for explaining measurement areas set in the images captured by the camera 1.

FIG. 3 is an explanatory diagram for explaining measurement areas set in the images captured by the camera 1 shown in FIG. 2. The images captured by the camera 1 include persons (customers) making payment at the checkout counters and persons in the queues waiting for checkout, and these persons approach the checkout counters from the back side (or far side) thereof remote from the camera 1 and leave the checkout counters from the front side (or near side) thereof close to the camera 1. Accordingly, in the present embodiment, to grasp the wait time, i.e., the time period required from when each person joins the queue to when the person finishes checkout at the checkout counter, a measurement area is set for each checkout counter so as to correspond to a region which persons who use the checkout counter must pass, and a stay duration in the measurement area is measured for each person.

FIG. 4 is an explanatory diagram for explaining various situations of persons and movement lines in a measurement area shown in FIG. 3. Parts (A-1), (B-1) and (C-1) in FIG. 4 show situations of persons, while parts (A-2), (B-2) and (C-2) in FIG. 4 show situations of movement lines.

If a person of interest is continuously detected from when the person entered the measurement area to when the person exited the measurement area as shown in part (A-1) in FIG. 4, it is possible to obtain a continuous, complete movement line from when the person entered the measurement area to when the person exited the measurement area as shown in part (A-2) in FIG. 4.

However, in a state where customers (persons) form a queue at the checkout counter to wait for checkout, an occlusion, which is a phenomenon in which, due to overlapping of persons, a "background" person is blocked from view, tends to occur easily. If occlusions occur, the accuracy of person detection decreases and the movement lines in the measurement area may become incomplete. Namely, the movement lines may include a missing part in the measurement area.

Specifically, as shown in part (B-1) in FIG. 4, if a person of interest is occluded by another person immediately before entering the measurement area, enters the measurement area undetected, and thereafter is detected within the measurement area, the movement line of the person of interest appears within the measurement area, as shown in part (B-2) in FIG. 4. In this case, the period of time from when the person of interest enters the measurement area to when the movement line is started, namely, to when the person of interest is first detected within the measurement area, is lost from the stay duration.

Further, as shown in part (C-1) in FIG. 4, if the person of interest is occluded by another person after the person of interest entered the measurement area so that the detection of the person of interest fails, and thereafter the person of interest exits the measurement area while being kept occluded, the movement line of the person of interest disappears within the measurement area, as shown in part (C-2) in FIG. 4. In this case, the period of time from when the movement line of the person of interest terminated, namely, from when the detection of the person of interest failed, to when the person of interest exited the measurement area is lost from the stay duration.

Thus, if a person's movement line includes a missing part in a measurement area, it is not possible to accurately measure the stay duration of the person in the measurement area based on the movement line. To solve such a problem, in the present embodiment, a stay duration measurement process for measuring a stay duration in a measurement area for each person includes a compensation process for, when it is determined that a movement line includes a missing part in a measurement area, obtaining a stay duration that is compensated for the missing part.

Next, a description will be given of a stay duration measurement process performed by the PC 3 shown in FIG. 1. FIG. 5 is a block diagram schematically showing a functional structure of the PC 3. It is to be noted that FIG. 5 shows only one camera 1 and one moving object tracking device 4 for the sake of simplicity, though the system may include multiple cameras 1 and moving object tracking devices 4, as shown in FIG. 1.

The PC 3 includes a tracking information storing unit 21, a movement line obtaining unit 22, a movement line information storing unit 23, a stay duration obtaining unit 24 and a stay duration storing unit (storing unit) 25.

The tracking information storing unit 21 cumulatively stores the tracking information obtained by the moving object tracking device 4. It is to be noted that, the tracking information includes a detection position of each person detected in each frame of image captured by the camera 1 and a detection time of each person obtained from the time of capture of the frame in which the person is detected.

The movement line obtaining unit 22 performs a process of obtaining the movement line of each person detected from the images covering the measurement areas. This movement line obtaining process is performed based on the tracking information generated by the moving object tracking device 4. More specifically, in a case where the process is performed based on the past data, the movement line obtaining unit 22 obtains the tracking information from the tracking information storing unit 21, while in a case where the process is performed in real time, the movement line obtaining unit 22 obtains the tracking information from the moving object tracking device 4. The information regarding the movement line of each person obtained by the movement line obtaining unit 22 is cumulatively stored in the movement line information storing unit 23. The movement line information includes pieces of information relating to movement vectors, positions and times of the points where the movement vectors change, etc. It is to be noted that, in the present embodiment, obtaining of each movement line is performed in the vicinity outside the measurement area also, such that it can be determined whether the boundary of the measurement area and the movement line intersect each other.

The stay duration obtaining unit 24 performs a process of obtaining a stay duration of each person in the relevant measurement area based on the movement line information for each person obtained by the movement line obtaining unit 22. The stay duration of each person obtained by the stay duration obtaining unit 24 is cumulatively stored in the stay duration storing unit 25.

The PC 3 further includes a movement line assessment unit 26, a compensation time model generation unit (learning model generation unit) 27 and a compensation time storing unit 28.

The movement line assessment unit 26 performs a process of determining whether each movement line obtained by the movement line obtaining unit 22 includes a missing part in the relevant measurement area. If it is determined in this movement line assessment unit 26 that the movement line of a person includes a missing part in the measurement area, the stay duration obtaining unit 24 performs a process of obtaining a stay duration that is compensated for the missing part.

The compensation time model generation unit 27 performs a process of collecting, for each measurement area, time periods required for movements of multiple persons in the measurement area and, by using the collected data, generating a compensation time model (learning model) in which compensation times are set such that a compensation time for a missing part in a movement line is determined based on the position of the missing part. The compensation time model generated by the compensation time model generation unit 27 is cumulatively stored in the compensation time storing unit 28.

The PC 3 further includes a measurement condition setting unit 29 and a compensation method setting unit 30.

The measurement condition setting unit 29 performs a process of setting, in accordance with input operations performed by a user, measurement conditions such as the number, position and shape of the measurement areas. The compensation method setting unit 30 performs a process of setting, in accordance with input operations performed by a user, a compensation method with which the stay duration obtaining unit 24 obtains a stay duration that is compensated for the missing part in the movement line. These input operations by the user are performed by use of the input device 6 such as a mouse.

The PC 3 further includes a statistical processing unit 31 and a screen generation unit (output information generation unit) 32.

The statistical processing unit 31 performs temporal statistical processing on the stay durations obtained for respective persons by the stay duration obtaining unit 24 and generating statistical information based thereon. Particularly, in the present embodiment, the statistical processing unit 31 performs a process of obtaining, based on the stay durations and stay time points (namely, a time point of entry into the measurement area and a time point of exit from the measurement area) of respective persons, a stay duration in each measurement area for each unit time (e.g., time slot), as the statistical information. Further, based on the stay time points of respective persons, the statistical processing unit 31 obtains, as the statistical information, a number of staying persons in each measurement area at each predetermined time, namely, a number of persons simultaneously staying in each measurement area at each predetermined time.

The screen generation unit 32 performs a process of generating, as output information including the statistical information generated by the statistical processing unit 31, screen information for causing the monitor 7 to display the statistical information. Specifically, in the present embodiment, the screen generation unit 32 generates, based on the statistical information obtained from the statistical processing unit 31 and the image information from the camera 1 or the recorder 2, screen information relating to a display image in which images representing the statistical information are superimposed on the image including the measurement areas.

It is to be noted that the various units of the PC 3 shown in FIG. 5 are realized by executing programs for stay duration measurement by the CPU of the PC 3. These programs may be pre-installed in the PC 3 serving as an information processing device to embody a device dedicated to stay duration measurement, or may be provided to a user in the form stored in an appropriate program recording medium as an application program that can be run on a general-purpose OS.

Figure 6:
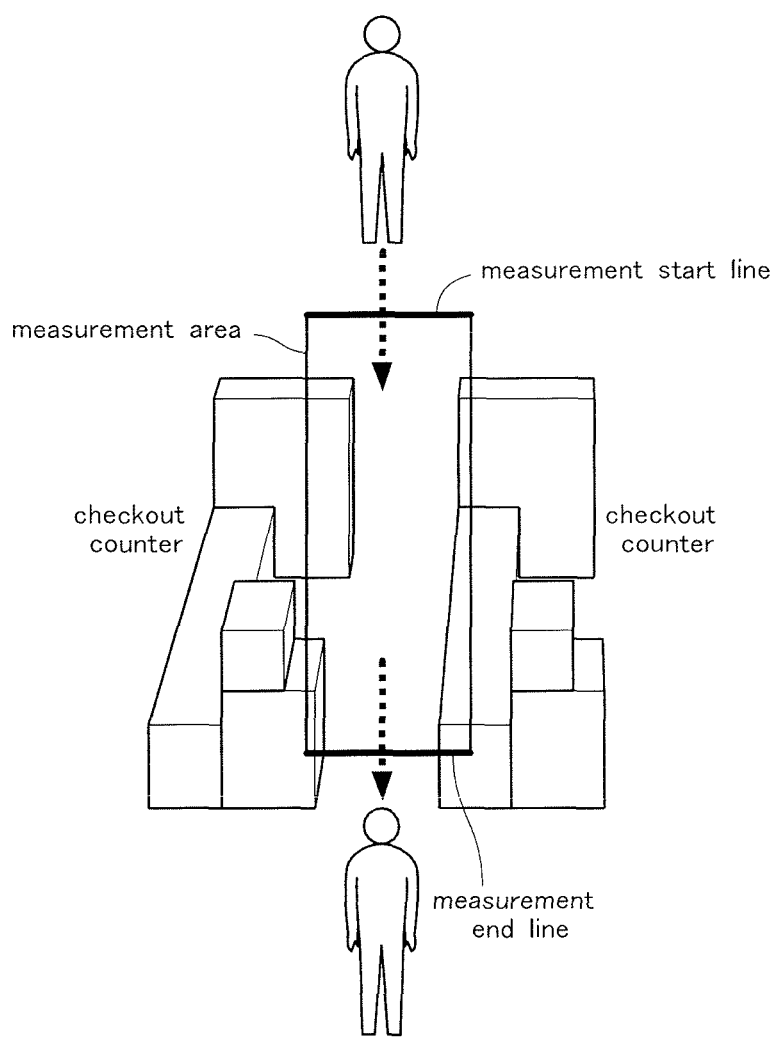
FIG. 6 is an explanatory diagram for explaining a measurement start line and a measurement end line set in a measurement area.

Next, a description will be given of a process performed by the movement line assessment unit 26 shown in FIG. 5. FIG. 6 is an explanatory diagram for explaining a measurement start line and a measurement end line set for a measurement area.

A measurement start line and a measurement end line are set on the boundary of each measurement area. The measurement start line is set on a part of the boundary which, based on the direction of movement of persons, is considered to be crossed by persons with a high probability when persons enter the measurement area. The measurement end line is set on a part of the boundary which is considered to be crossed by persons when persons exit the measurement area. In the example shown in FIG. 6, the measurement start line and the measurement end line are respectively set on opposing sides of a measurement area having a rectangular shape.

The measurement start line and the measurement end line are set by the measurement condition setting unit 29 in accordance with input operations performed by a user, and thus, the user can set these lines to extend over a desired extent on the boundary of the measurement area. It is to be noted that, the measurement area also may be set as desired. For instance, in an ATM corner of a bank, the way the queue is formed may be changed depending on the number of the customers, and if the way the queue is formed is changed, the direction of movement of persons (customers) also changes. Thus, in accordance with the way the queue is formed, the setting of the measurement start line, measurement end line and measurement area should be changed.

It is to be noted that the setting of the measurement start line, measurement end line and measurement area may be performed by displaying an image captured by the camera 1 on the monitor 7 and then, on the image displayed on the monitor 7, designating the points for defining the position, shape, size, etc. of the measurement area and the position, length, etc. of the measurement start line and measurement end line by operating the input device 6. For example, when the measurement area is of a rectangular shape, the measurement area may be set by designating the upper left corner point and the lower right corner point on the image displayed on the monitor 7.

The movement line assessment unit 26 performs a process of determining whether each movement line in each measurement area includes a missing part, as shown in FIG. 4. In this movement line assessment process, when a movement line crosses only one or neither of the measurement start line and the measurement end line, it is determined that the movement line includes a missing part.

Namely, as shown in part (B-2) in FIG. 4, in the case of an appearing pattern in which a movement line appears within a measurement area, the movement line does not cross the measurement start line and crosses only the measurement end line. On the other hand, as shown in part (C-2) in FIG. 4, in the case of a disappearing pattern in which a movement line disappears within a measurement area, the movement line crosses the measurement start line but does not cross the measurement end line. In these cases, it is determined that the movement line includes a missing part in the relevant measurement area.

Further, the movement line assessment unit 26 discriminates between the appearing pattern as shown in part (B-2) in FIG. 4 and the disappearing pattern as shown in part (C-2) in FIG. 4. This discrimination can be performed by determining which of the measurement start line and the measurement end line the movement line does not cross.

Next, a detailed explanation will be given of a process performed by the stay duration obtaining unit 24 shown in FIG. 5.

The stay duration obtaining unit 24 performs a process of, in the case where the movement line assessment unit 26 determines that a movement line includes a missing part in the relevant measurement area, obtaining a stay duration that is compensated for the missing part based on the time period(s) required for movement(s) of one or more other persons in the measurement area. On the other hand, in the case where it is determined that a movement line does not include a missing part, the stay duration obtaining unit 24 obtains a stay duration based on the time information relating to entry and exit to and from the measurement area, specifically, entrance time and exit time to and from the measurement area.

This stay duration obtaining process includes a stay duration replacement process that replaces the stay duration of a person whose movement line includes a missing part with the stay duration of another person whose movement line does not include a missing part in the measurement area and a model-based compensation process that, based on the compensation time model obtained by learning, obtains a compensation time corresponding to the missing part in the movement line based on the position of the missing part and obtains a modified stay duration using the compensation time, and these processes are selectively performed in accordance with a selection operation performed by a user.

First, a description will be given of the stay duration replacement process performed by the stay duration obtaining unit 24. In the case where the stay duration replacement process is selected, if it is determined by the movement line assessment unit 26 that the movement line of a person of interest includes a missing part in the relevant measurement area, the stay duration obtaining unit 24 performs a process of replacing the stay duration of the person of interest with the stay duration of another person whose movement line does not include a missing part in the measurement area.

Specifically, in the present embodiment, the stay duration obtaining unit 24 performs a process of replacing the stay duration of the person of interest with the stay duration of a person who, of the other persons whose movement line does not have a missing part in the measurement area, is temporally closest to the person of interest. Namely, the stay duration obtaining unit 24 obtains the movement line information of each person from the movement line information storing unit 23, searches for a person whose stay time point is closest to the stay time point of the person of interest and whose movement line does not include a missing part in the measurement area, and sets the stay duration of this person as the stay duration of the person of interest. It is to be noted here that the stay time point may be a time point of entry into the measurement area and/or a time point of exit from the measurement area. For example, in the case where the movement line of the person of interest appears within the measurement area as shown in part (B-2) in FIG. 4, the time point of entry into the measurement area of the person of interest cannot be obtained, and thus, the search for the person who is temporally closest to the person of interest is performed using the time point of exit from the measurement area as the stay time point. On the other hand, in the case where the movement line of the person of interest disappears within the measurement area as shown in part (C-2) in FIG. 4, the time point of exit from the measurement area of the person of interest cannot be obtained, and thus, the search is performed using the time point of entry into the measurement area as the stay time point. Thus, the search for the person who is temporally closest to the person of interest is performed using the entry time or exit time which can be obtained for the person of interest.

FIG. 7 is a flowchart showing a process performed by the PC 3 in a case where the stay duration replacement process is selected.

The PC 3 first obtains the tracking information of a person of interest from the moving object tracking device 4 (ST101), and the tracking information of the person of interest is cumulatively stored in the tracking information storing unit 21. Then, the movement line obtaining unit 22 performs a process of obtaining the movement line of the person of interest based on the tracking information of the person of interest (ST102), and the movement line of the person of interest information is cumulatively stored in the movement line information storing unit 23. Subsequently, the movement line assessment unit 26 performs the movement line assessment to determine whether the movement line of the person of interest includes a missing part in the measurement area (ST103).

If it is determined in this movement line assessment (ST103) that the movement line of the person of interest includes a missing part in the measurement area (YES in ST103), the stay duration obtaining unit 24 obtains, from the pieces of movement line information cumulatively stored in the movement line information storing unit 23 for respective persons, the stay duration of another person who meets the replacement condition, namely, another person who is temporally closest to the person of interest and whose movement line does not include a missing part in the measurement area (ST104), and replaces the stay duration of the person of interest with the obtained stay duration (ST105). After replacement, the stay duration of the person of interest is cumulatively stored in the stay duration storing unit 25 (ST106).

On the other hand, if it is determined in the movement line assessment (ST103) that the movement line of the person of interest does not include a missing part in the measurement area (NO in ST103), the stay duration obtaining unit 24 calculates a stay duration based on a time point of entry into the measurement area and a time point of exit from the measurement area (ST107), and the stay duration obtained thereby is cumulatively stored in the stay duration storing unit 25 (ST108).

The above-described process is repeated until the process is performed for every person of interest.

Figures 8A, 8B:
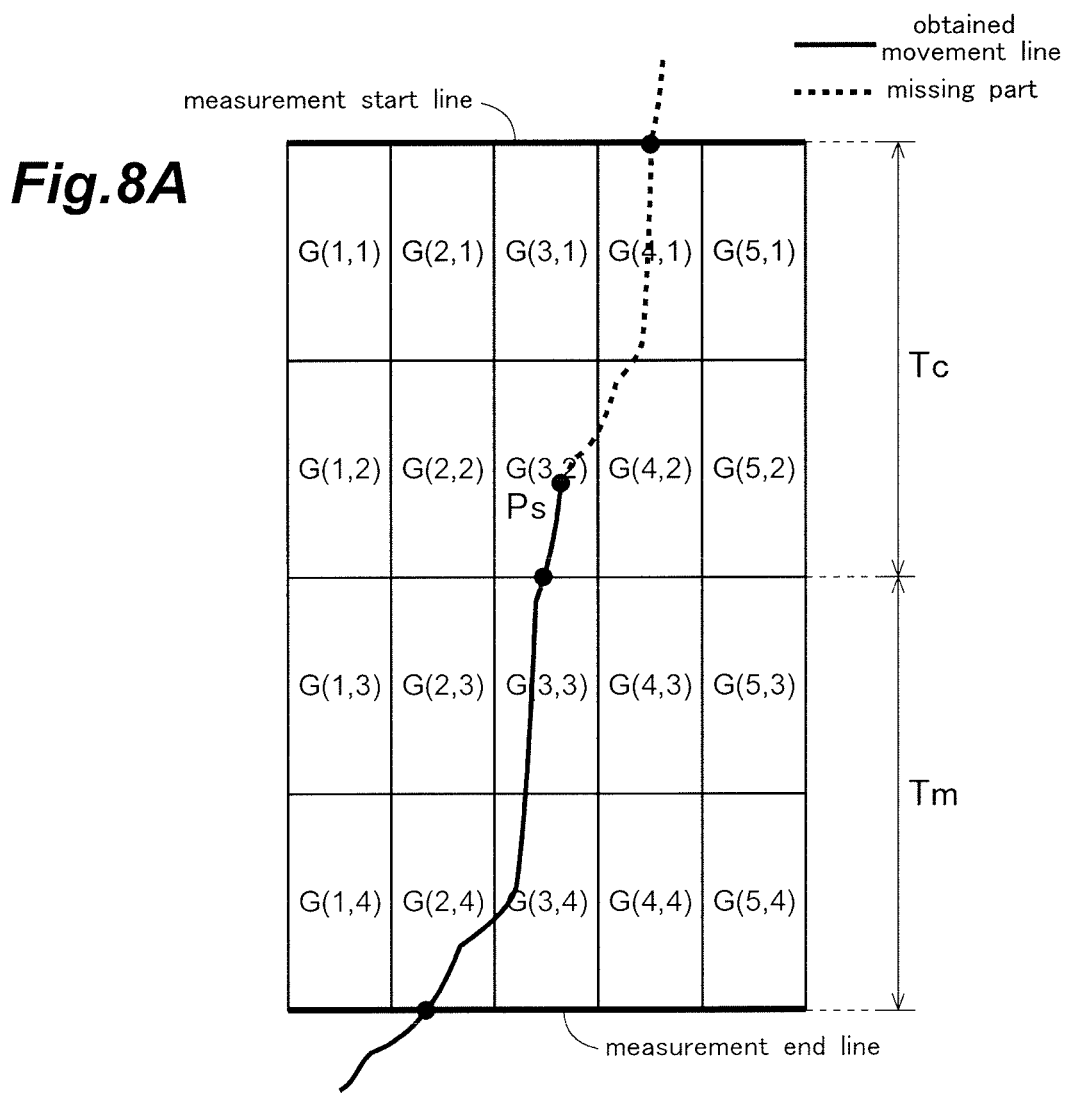
FIGS. 8A and 8B are explanatory diagrams for explaining a process performed by a stay duration obtaining unit 24 in the case of an appearing pattern in which a movement line appears within a measurement area.

Next, a description will be given of a process performed by the compensation time model generation unit 27 and the stay duration obtaining unit 24 shown in FIG. 5. FIGS. 8A and 8B are explanatory diagrams for explaining a process performed by the stay duration obtaining unit 24 in the case of the appearing pattern in which a movement line appears within a measurement area. FIGS. 9A and 9B are explanatory diagrams for explaining a process performed by the stay duration obtaining unit 24 in the case of the disappearing pattern in which a movement line disappears within a measurement area. FIG. 8A and FIG. 9A show states of movement lines in a measurement area, and FIG. 8B and FIG. 9B show compensation time models generated by the compensation time model generation unit 27 and used by the stay duration obtaining unit 24.

The moving speed of a person in the measurement area is not constant and varies depending on the position in the measurement area. Namely, a person who is in the queue formed at the checkout counter moves slowly, a person who is making checkout stands still, and a person who has finished checkout moves quickly. Thus, the compensation time corresponding to the missing part in the movement line can vary depending on the position of the missing part in the movement line.

Based on such insight, in the present embodiment, the compensation time model generation unit 27 is configured to collect, for each measurement area, time periods required for movements of multiple persons in the measurement area and, by using the collected data, generate a compensation time model (learning model) in which compensation times are set such that a compensation time for a missing part in a movement line is determined based on the position of the missing part, and the stay duration obtaining unit 24 is configured to obtain, based on the compensation time model, a compensation time in accordance with the position of the missing part in the movement line and, using this compensation time, obtain a stay duration compensated for the missing part.

In the present embodiment, each measurement area is divided into a plurality of grid cells (division areas), and the compensation time model generation unit 27 performs a process of collecting time periods required for movements of multiple persons in the measurement area on the basis of grid cells and, by use of the collected data, obtaining a compensation time model that sets a compensation time for each grid cell, while the stay duration obtaining unit 24 performs a process of obtaining, based on the compensation time model, a compensation time in accordance with the position of one or more grid cells in which the missing part of the movement line is present. Namely, the time period required to move through one or more grid cells that do not include a portion of the missing part is obtained from actual measurement time, the time period required to move through one or more grid cells that include a portion of the missing part is obtained from the compensation time model, and a stay duration in the entirety of the measurement area is obtained by adding these time periods together. It is to be noted that the compensation time model can be embodied as a table setting forth the compensation time for each grid cell.

Next, a detailed explanation will be given of the model-based compensation process performed by the stay duration obtaining unit 24. Herein, as the cases in which the movement line includes a missing part in the measurement area, the appearing pattern in which a movement line appears within a measurement area as shown in FIG. 8A and the disappearing pattern in which a movement line disappears within a measurement area as shown in FIG. 9A will be considered.

First, a description will be given of the case where a person's movement line appears within a measurement area as shown in FIG. 8A. In this case, the compensation time model is configured to set compensation times as time periods considered to be required for a person entering the measurement area (namely, a person crossing the measurement start line) to reach various positions in the measurement area, and the stay duration obtaining unit 24 obtains, based on this compensation time model, a compensation time in accordance with the position of the start point of the movement line.

Particularly, in the present embodiment, the compensation times are obtained on the basis of grid cells as described in the foregoing, and the compensation time model is configured to set a compensation time for each grid cell as a time period required from when a person crosses the measurement start line to when the person exits each grid cell. Therefore, a compensation time allocated to one grid cell indicates an accumulation of time periods required to pass through the grid cells including a portion of the missing part that has an end point in the one grid cell, and the compensation time model sets a compensation time for each grid cell (i, j) such that the compensation time has a larger value for the grid cell positioned at a larger distance from the measurement start line, as shown in FIG. 8B. The stay duration obtaining unit 24 obtains the time period to pass through the grid cell in which the start point of the movement line is located and the grid cell(s) upstream thereof by referring to the compensation time model, and obtains the time period to pass through the grid cells downstream of the grid cell in which the start point of the movement line is located from actual measurement time.

In the example shown in FIG. 8A, the start point Ps of the movement line is present in the grid cell G (3, 2). Accordingly, based on the compensation time model shown in FIG. 8B, a compensation time Tc=8 for the grid cell G (3, 2) in which the start point Ps of the movement line is located is obtained. Further, based on the movement line information, an actual measurement time Tm from when the movement line exits the grid cell G (3, 2) to when the movement line reaches the measurement end line. Then, the compensation time Tc=8 corresponding to the grid cell G (3, 2) is added to the actual measurement time Tm to obtain the stay duration.

Next, a description will be given of the case of the disappearing pattern in which a person's movement line disappears within a measurement area, as shown in FIG. 9A. In this case, the compensation time model is configured to set compensation times as time periods considered to be required for a person to move from various positions in the measurement area to exit the measurement area (namely, to reach the measurement end line), and the stay duration obtaining unit 24 obtains, based on this compensation time model, a compensation time in accordance with the position of the end point of the movement line.

Particularly, in the present embodiment, the compensation times are obtained on the basis of grid cells as described in the foregoing, and the compensation time model sets a compensation time for each grid cell as a time period required from when a person enters each grid cell to when the person reaches the measurement end line. Therefore, a compensation time allocated to one grid cell indicates an accumulation of time periods required to pass through the grid cells including a portion of the missing part that has a start point in the one grid cell, and the compensation time model sets a compensation time for each grid cell (i, j) such that the compensation time has a smaller value for the grid cell positioned at a smaller distance to the measurement end line, as shown in FIG. 9B. The stay duration obtaining unit 24 obtains the time period to pass through the grid cell in which the end point of the movement line is located and the grid cell(s) upstream thereof from actual measurement time, and obtains the time period to pass through the grid cell(s) downstream of the grid cell in which the end point of the movement line is located by referring to the compensation time model.

In the example shown in FIG. 9A, the end point Pe of the movement line is present in the grid cell G (3, 2). Accordingly, based on the compensation time model shown in FIG. 9B, a compensation time Tc for the grid cell G (3, 2) in which the end point Pe of the movement line is located is obtained. Further, based on the movement line information, an actual measurement time Tm elapsed from when the person crosses the measurement start line to when the person enters the grid cell G (3, 2) is obtained. Then, the compensation time Tc=7 corresponding to the grid cell G (3, 2) is added to the actual measurement time Tm to obtain the stay duration.

Figure 10:
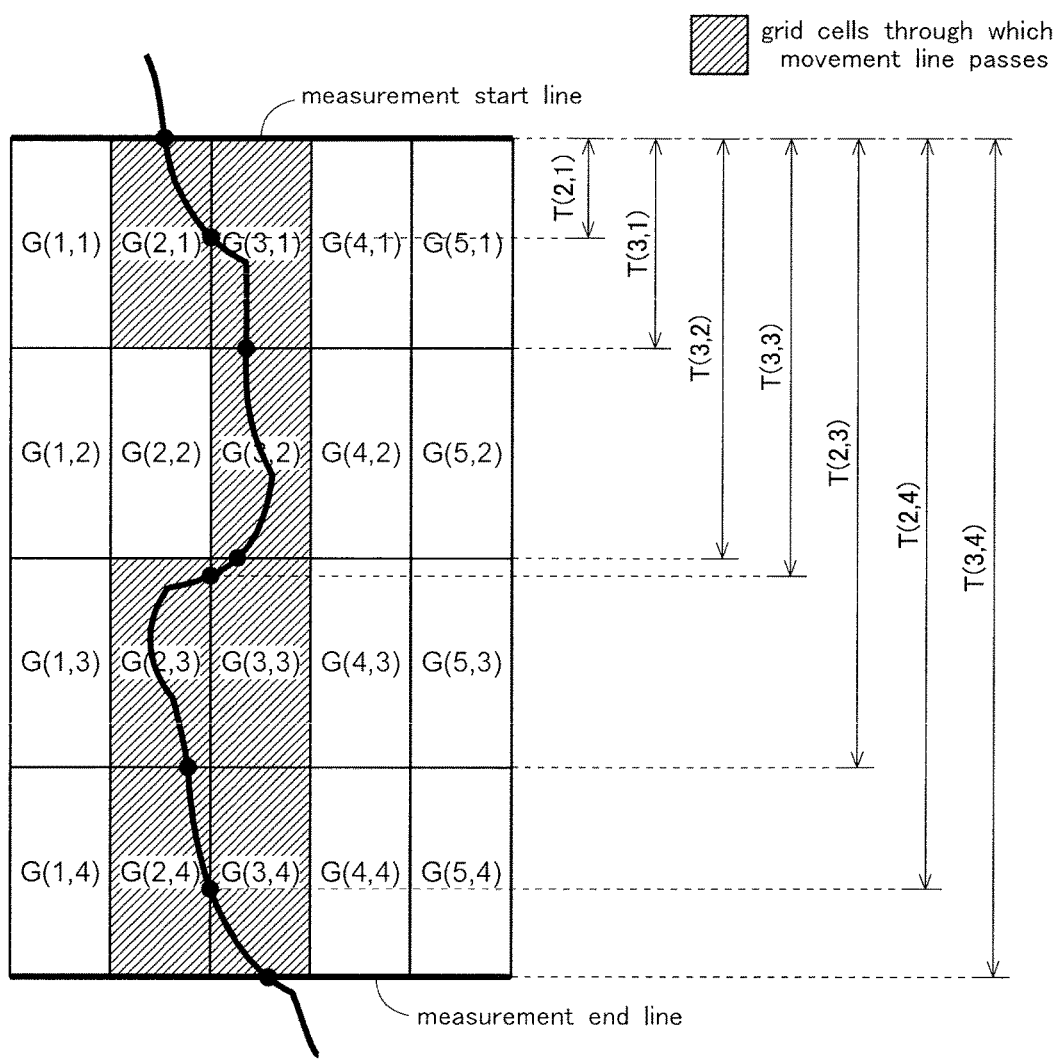
FIG. 10 is an explanatory diagram for explaining a process performed by a compensation time model generation unit 27.

Next, a description will be given of a process performed by the compensation time model generation unit 27 shown in FIG. 5. FIG. 10 is an explanatory diagram for explaining a process performed by the compensation time model generation unit 27, particularly, a process of generating a compensation time model corresponding to the appearing pattern in which a movement line appears within a measurement area.

As described above, the compensation time model generation unit 27 performs a process of collecting, for each measurement area, time periods required for movements of multiple persons in the measurement area and, by using the collected data, generating a compensation time model (learning model) in which compensation times are set such that a compensation time for a missing part in a movement line is determined based on the position of the missing part. This process is performed based on movement lines that do not include a missing part.

Particularly, for the appearing pattern in which a movement line appears within a measurement area as shown in FIG. 8A, time periods required from entering the measurement area to reaching various positions in the measurement area, namely, time periods required from crossing the measurement start line to exiting from various grid cells, are collected based on the movement lines that do not include a missing part, and a compensation time for each grid cell is obtained by averaging the time periods collected for each grid cell.

Specifically, as shown in FIG. 10, for each of the grid cell Gs (i, j) that a certain movement line passes, a time period T (i, j) that is required from when the movement line crosses the measurement start line to when the movement line exits the grid cell G (i, j) is calculated, and this process is repeated for multiple movement lines that do not include a missing part. When multiple required time periods T (i, j) are obtained for a grid cell G (i, j), by averaging the required time periods T (i, j) for the grid cell G (i, j), a compensation time for the grid cell G (i, j) is obtained. It is to be noted that, for a grid cell G (i, j) for which only one required time period T (i, j) is obtained, the required time period T (i, j) as it is is used as the compensation time for the grid cell.

Since the compensation time for each grid cell G (i, j) is obtained in the above-described way, the more the number of samples of the movement lines passing each grid cell G (i, j) are, the more accurate the compensation time for the grid cell G (i, j) becomes. On the other hand, a compensation time cannot be obtained for a grid cell G (i, j) that no movement line passes, and further, if the number of samples of the movement lines passing through a certain grid cell G (i, j) is small, the accuracy of the compensation time for the grid cell G (i, j) decreases, though they would not raise a significant problem because there is a low possibility that persons (or movement lines) pass such grid cells G (i, j) in the first place.

On the other hand, in the process of generating a compensation time model for the disappearing pattern in which a movement line disappears within a measurement area as shown in FIGS. 9A and 9B, the compensation time for each grid G (i, j) is obtained as a time period required to move from each grid G (i, j) to the measurement end line, as opposed to the case of the appearing pattern shown in FIG. 10. Specifically, time periods required from entering the respective grid cells to reaching the measurement end line are collected based on the movement lines that do not include a missing part, and a compensation time for each grid cell is obtained by averaging the time periods collected for each grid cell.

This compensation time model generation process may be performed in an occasional update mode in which the compensation time model is updated at proper times while processing is performed for the detected persons or in a batch generation mode in which the compensation time model is generated based on the movement line information of persons whose movement line does not include a missing part in the measurement area for a certain period of time.

In the batch generation mode, a compensation time model is generated by processing the tracking information obtained for one day, for example, and the processing on the next day and thereafter is performed using this compensation time model. In this case, once the compensation time model is generated, the compensation time model is not updated in the processes thereafter.

It is also possible in the batch generation mode to generate, based on the stay time points obtained for each person, compensation time models for different time slots. In this case, the stay duration obtaining unit 24 obtains a compensation time by use of a compensation time model of an appropriate time slot (namely, a time slot in which the person (moving object) of interest was detected). For example, when the work is finished for a certain day, compensation time models for respective time slots may be generated from the movement line information obtained for that day, so that during the processing on the next day, a compensation time is obtained by using, of these compensation time models, a compensation time model of an appropriate time slot. In this case, in the process of generating the compensation time models, collection of the required time periods T (i, j) for each grid cell is performed for each time slot.

It is to be noted that it is difficult to use the compensation time model in a case where the measurement conditions, namely, settings of the measurement areas and the measurement start line and measurement end line of each measurement area, differ from those under which the compensation time model was generated, and thus, when the settings of the measurement areas, measurement start lines and/or measurement end lines are changed, the compensation time model should be generated anew.

Figure 11:
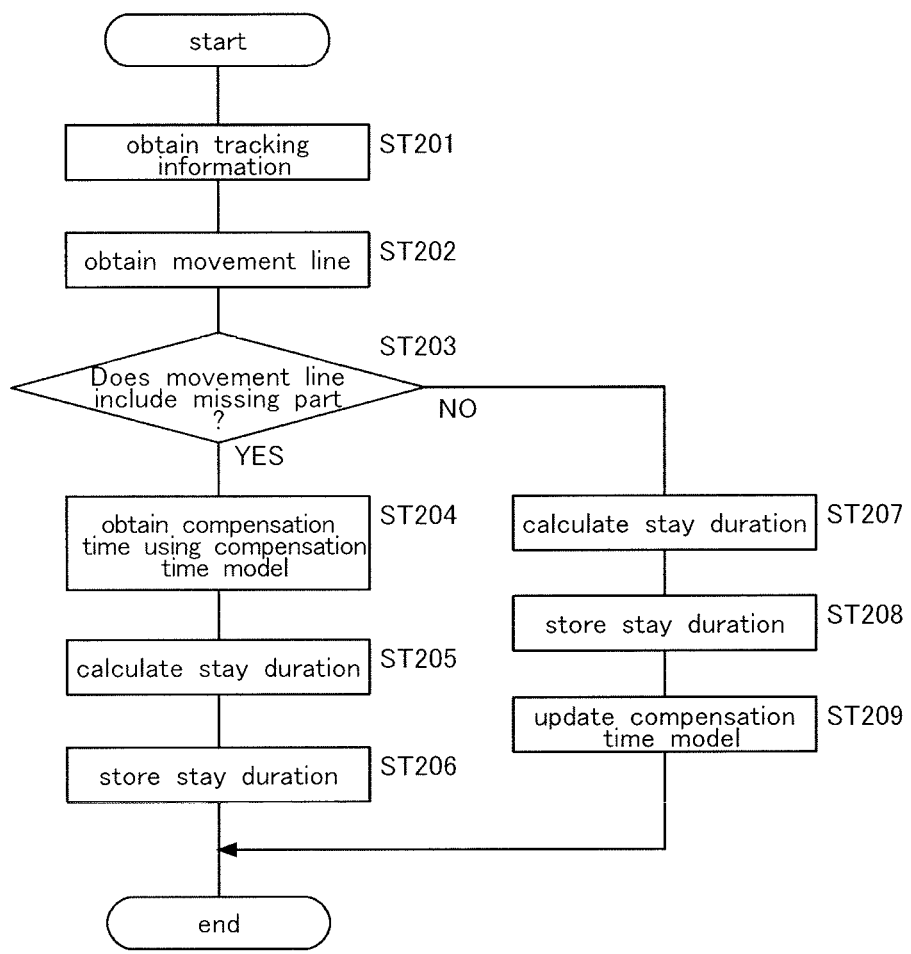
FIG. 11 a flowchart showing a process performed by the PC 3 in a case where a model-based compensation process is selected.

FIG. 11 a flowchart showing a process performed by the PC 3 in a case where the model-based compensation process is selected. With reference to FIG. 11, a description will be given of the occasional update mode in which the compensation time model is updated at proper times while processing is performed for the detected persons.

The PC 3 first obtains the tracking information of a person of interest from the moving object tracking device 4 (ST201), and the tracking information of the person of interest is cumulatively stored in the tracking information storing unit 21. Then, the movement line obtaining unit 22 performs a process of obtaining the movement line of the person of interest based on the tracking information of the person of interest (ST202), and the movement line information of the person of interest is cumulatively stored in the movement line information storing unit 23. Subsequently, the movement line assessment unit 26 performs the movement line assessment to determine whether the movement line of the person of interest includes a missing part in the measurement area (ST203).

If it is determined in this movement line assessment (ST203) that the movement line of the person of interest includes a missing part in the measurement area (YES in ST203), the stay duration obtaining unit 24 obtains, by using the compensation time model, a compensation time (ST204), and subsequently calculates the stay duration of the person of interest based on the obtained compensation time (ST205). Then, the stay duration of the person of interest is cumulatively stored in the stay duration storing unit 25 (ST206).

On the other hand, if it is determined in the movement line assessment (ST203) that the movement line of the person of interest does not include a missing part in the measurement area (NO in ST203), the stay duration obtaining unit 24 calculates a stay duration based on a time point of entry into the measurement area and a time point of exit from the measurement area (ST207), and the stay duration obtained thereby is cumulatively stored in the stay duration storing unit 25 (ST208). Further, based on the movement line information of the person of interest, the compensation time model is updated (ST209).

The above-described process is repeated until the process is performed for every person of interest.

As described in the foregoing, in the occasional update mode, every time a movement line that does not include a missing part is found, a process of updating the compensation time model is performed.

Here, a procedure of updating the compensation time model in the occasional update mode will be described in the following, taking as an example the compensation time model to be used in the case of the appearing pattern as shown in FIGS. 8A and 8B. First, when a movement line with no missing part is found, a required time period T (i, j) for each of the grid cells G (i, j) that the movement line passed is calculated (see FIG. 10), and the required time periods T (i, j) are cumulatively stored in the compensation time storing unit 28 as compensation times. Thereafter, when another movement line without a missing part is found, a required time period T (i, j) for each of the grid cells G (i, j) that this movement line passed is calculated, and for a grid cell for which one or more required time periods T (i, j) have been cumulatively stored already, the required time periods including the newly obtained one are averaged to obtain a new compensation time. Then, the compensation times for respective grid cells are updated. The above updating process is repeated every time a movement line having no missing part is obtained.

As described in the foregoing, in the present embodiment, it is possible to obtain, even for a person whose movement line in a measurement area is incomplete, a stay duration comparable to that which would be obtained if the movement line in the measurement area were complete. Therefore, it is possible to obtain a stay duration without a significant error for every person detected, and hence, to grasp the staying state correctly under crowded condition where it is particularly important to grasp the staying state. Further, in a case where it is desired to grasp the temporal change of the stay duration, it is possible to avoid an unnatural situation that the stay duration is not displayed when actually there are persons staying in the measurement area.

Further, in the present embodiment, the movement line assessment to determine whether a movement line includes a missing part in the measurement area can be carried out by merely determining whether the movement line crosses each of the measurement start line and the measurement end line, and thus, the movement line assessment can be performed easily.

Still further, in the present embodiment, it is possible to select a model-based compensation process in which a compensation time model that sets compensation times for compensating for missing parts in movement lines is formed by learning, and a compensation time for a missing part in a movement line in question is obtained based on the compensation time model. Thus, by selecting this mode, it is possible to obtain a highly accurate stay duration.

Still further, in the present embodiment, for the appearing pattern in which a movement line appears within a measurement area, a compensation time model is generated such that the compensation time model sets compensation times as time periods required from entering the measurement area to reaching various positions in the measurement area, specifically, to exiting from various grid cells, and based on this compensation time model, a compensation time for a movement line of interest is obtained in accordance with the start point of the movement line, specifically, in accordance with the position of the grid cell in which the start point of the movement line is present. Thus, the compensation time in the case of the appearing pattern can be obtained easily and with high accuracy.

Still further, in the present embodiment, for the disappearing pattern in which a movement line disappears within a measurement area, a compensation time model is generated such that the compensation time model sets compensation times as time periods required to move from various positions in the measurement area to an outside of the measurement area, specifically, from entering various grid cells to exiting the measurement area, and based on this compensation time model, a compensation time for a movement line of interest is obtained in accordance with the position of the end point of the movement line, specifically, in accordance with the position of the grid cell in which the end point of the movement line is present. Thus, the compensation time in the case of the disappearing pattern can be obtained easily and with high accuracy.

Still further, in the present embodiment, the measurement area is divided into a plurality of grid cells, and a compensation time model is generated to set a compensation time for each grid cell, such that, based on the compensation time model, a compensation time for a movement line of interest is obtained. Thus, the compensation time model can be generated easily, while the stay duration can be obtained with practically sufficient accuracy.

Still further, in the present embodiment, compensation time models are generated for respective time slots, and a compensation time is obtained by use of the compensation time model of an appropriate time slot, whereby a compensation time reflecting the moving situation of the persons in the measurement area can be obtained, where the movement situation can vary depending on the time slot. Thus, the accuracy of the compensation time obtained can be improved.

Still further, in the present embodiment, it is possible to select a stay duration replacement process in which the stay duration of a person whose movement line is determined to include a missing part in the measurement area is replaced with the stay duration of another person whose movement line does not include a missing part in the measurement area. When this process is selected, a stay duration having no or reduced influence of a missing part in a movement line can be obtained by simply replacing the stay duration of the person of interest with the stay duration of another person, and thus, the process of obtaining the stay duration can be performed easily.

Particularly, in the present embodiment, the stay duration of a person whose movement line is determined to include a missing part in the measurement area is replaced with the stay duration of a person who, of the other persons whose movement line does not include a missing part in the measurement area, is temporally closest to the person whose movement line is determined to include a missing part. The person who is temporally closest to the person of interest is highly likely to have been in a similar situation to that the person of interest was in, and hence, is highly likely to have a stay duration close to that of the person of interest. Therefore, by replacing the stay duration of the person of interest with the stay duration of the temporally closest person, it is possible to obtain a highly accurate stay duration.

Further, in the present embodiment, the measurement conditions (settings of the measurement areas and the measurement start line and measurement end line of each measurement area), and the compensation method (the stay duration replacement process and the model-based compensation process) can be set in accordance with input operations performed by a user, and thus, the user can appropriately select the measurement conditions and compensation method. This improves the convenience of the user.

Figure 12:
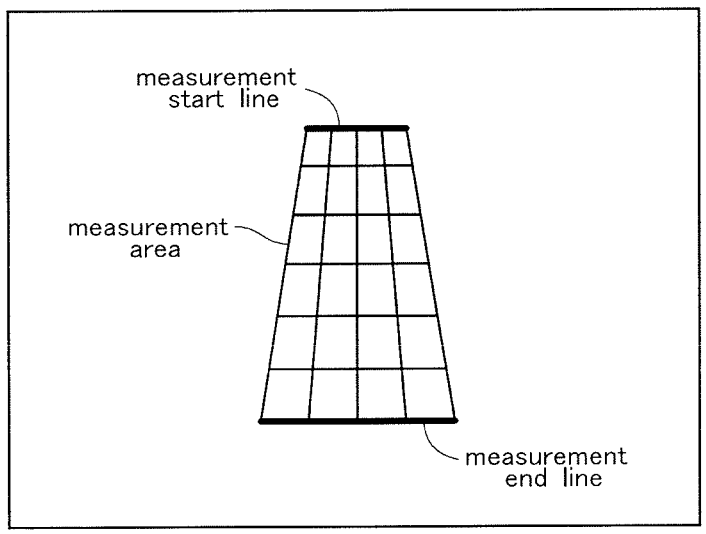
FIG. 12 is an explanatory diagram for explaining a modification of the measurement area and grid cell.

FIG. 12 is an explanatory diagram for explaining a modification of the measurement area and the grid cell. In the examples shown in FIGS. 8A and 8B and FIGS. 9A and 9B, rectangular measurement areas were set, and each measurement area was divided into rectangular grid cells (division areas). However, the shape of each measurement area and grid cell is not limited to rectangle, and may be selected appropriately depending on the circumstances in or around the measurement area.

In the example shown in FIG. 12, the measurement area and the grid cells there in are defined to have a trapezoidal shape. In a case where the camera 1 is positioned relative to checkout counter as shown in FIG. 2, persons enter the measurement area from the far side remote from the camera 1 and exit the measurement area to the near side close to the camera 1, and in the images taken by the camera 1, a person on the far side remote from the camera 1 appears small while a person on the near side close to the camera 1 appears large. Thus, in the example shown in FIG. 12, in accordance with the apparent size of a person, the measurement area and the grid cells are defined to be in a trapezoidal shape such that a part on the far side is smaller than a part on the near side.

It is to be noted that, in the above embodiment, the measurement area was divided in a grid pattern into grid cells (division areas), the present invention is not limited to a structure in which the measurement area is divided in a grid pattern, and the measurement area may be divided by any appropriate division lines in accordance with the situation inside the measurement area. Further, the number of divisions of the measurement area (number of division areas) may be selected as appropriate. Also, the division areas do not have to have an identical size, and each division area may have an appropriate size in accordance with the situation inside the measurement area.

Next, a description will be given of a process performed by the statistical processing unit 31 shown in FIG. 5. The statistical processing unit 31 performs a process of obtaining, based on the stay duration and stay time points obtained for each person, a stay duration at each predetermined time point. Further, the statistical processing unit 31 performs a process of obtaining, based on the stay time points obtained for each person, a number of staying persons at each predetermined time point, namely, a number of persons present in the measurement area simultaneously. It is to be noted that in the case where there are multiple measurement areas, the stay duration at each predetermined time point and the number of staying persons at each predetermined time point are obtained for each measurement area.

The stay duration at each predetermined time point can be obtained by, based on the stay time points obtained for each person, totaling the stay durations of persons for each predetermined time point. Specifically, a person(s) staying in the measurement area at each predetermined time point are extracted based on the stay time points obtained for each person, and the stay duration at each predetermined time point is obtained from the stay duration(s) of the person(s) extracted for that time point. It is to be noted here that if there are multiple persons present in the measurement area at a certain time point, the stay durations of these persons are averaged. Further, the extraction of a person(s) staying in the measurement area at each predetermined time point based on the stay time points obtained for each person provides the number of staying persons at each predetermined time point.

It is to be noted that the stay time points obtained for each person, namely, the time point of entry into the measurement area and the time point of exit from the measurement area, can be obtained from the movement line information of each person stored in the movement line information storing unit 23. The movement line information storing unit 23 stores, as the movement line information for each person, the position of the person in relation to time, and thus, the stay time points of each person can be obtained from the movement line information.

Next, a description will be given of an example of output of statistical information generated by the statistical processing unit 31. As described above, the statistical processing unit 31 performs a temporal statistical processing of the stay durations obtained for respective persons by the stay duration obtaining unit 24 and generating statistical information based thereon, and the screen generation unit 32 performs a process of generating screen information relating to a display screen (display image) in which the statistical information is shown, such that the statistical information is displayed on the monitor 7. In the following, a description will be given of the display image displayed on the monitor 7 to show the statistical information.

First, a description will be given of an example in which statistical information is displayed in the form of a table. FIG. 13 is an explanatory diagram for explaining such an example.

In the example shown in FIG. 13, statistical information (stay duration and number of staying persons) at a designated time point is displayed in the form of a table. Particularly, in this example, measurement areas A to D are set corresponding to four checkout counters, respectively, and a number of staying persons, a stay duration and a degree of reliability are displayed for each of the measurement areas A to D.

The degree of reliability indicates the likelihood of correctness of the stay duration. Provided that the number of persons for which the compensation process (the stay duration replacement process and the model-based compensation process) was performed as the movement line included a missing part in the measurement area is expressed by Na, and the number of persons whose movement line does not include a missing part in the measurement area person is expressed by Nb, the degree of reliability can be expressed as a ratio of Na to Nb, as shown in the following equation:

degree of reliability=$Na/Nb\times100$

It is to be noted that the degree of reliability may be obtained as a ratio of Na to the total number of persons, as in the following equation:

degree of reliability=$Na/(Na+Nb)\times100$

It is to be noted that statistical information of designated time slot may be displayed. In this case, the stay duration and number of staying persons for a certain time slot can be obtained by averaging the stay durations and the numbers of staying persons obtained for time points belonging to the time slot.

Figure 14:
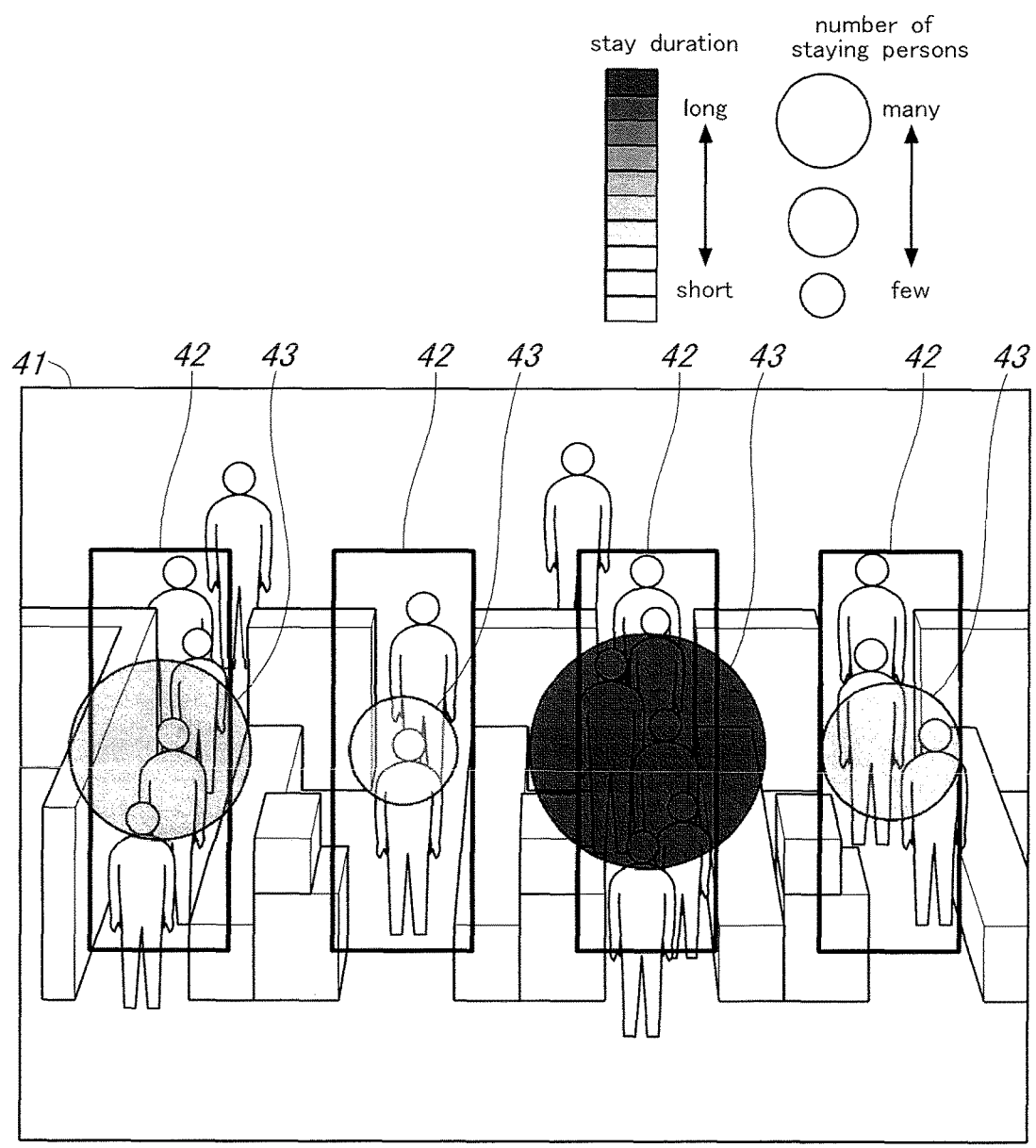
FIG. 14 is an explanatory diagram for explaining an example in which statistical information is displayed as images.

Next, a description will be given of an example in which statistical information is displayed as images. FIG. 14 is an explanatory diagram for explaining such an example.

In the example shown in FIG. 14, frame images 42 representing respective measurement areas and images 43 each representing statistical information (stay duration and number of staying persons) are displayed superimposed on the image 41 taken by the camera 1 to include the measurement areas. Further, the images 43 representing statistical information are displayed to be arranged so as to correspond to (in this example, to be superimposed on) respective measurement areas.

Each image 43 representing statistical information is configured such that the magnitude of the numerical value(s) representing the statistical information is expressed by an attribute(s) of the image 43, where the attribute(s) includes at least one of the size, tint (hue) and darkness (shade). Specifically, in the example shown in FIG. 14, the darkness of the fill color of each circular image 43 represents a stay duration and the size of each image 43 represents a number of staying persons, such that the longer the stay duration is, the darker the image 43 becomes, and the larger the number of staying persons is, the larger the size of the image 43 becomes.

Particularly, in the present embodiment, the image 41 can be displayed as a moving image, in which each image 43 representing statistical information indicates the statistical information corresponding to the time of image capture, so that, as the statistical information changes while the moving image is played, each image 43 representing statistical information also changes. Namely, in response to the change of the stay duration and the number of staying persons along with playing of the moving image, the degree of darkness of the color and the size of each image 43 change.

It is to be noted that, in the example shown in FIG. 14, the images 43 representing statistical information are displayed to be transparent or translucent, whereby it is possible to check the status of persons shown in the regions in the image 41 covered by the images 43 representing statistical information.

As described above, in the present embodiment, a temporal statistical processing is performed on the stay durations to generate statistical information, and output information including the statistical information is output, whereby a user can grasp a temporal change in the stay duration.

Further, in the present embodiment, an image(s) representing statistical information is displayed superimposed on an image including a measurement area(s). Therefore, it is possible to check the staying state of persons in the measurement area while comparing it with an actual state of persons shown in the image including the measurement area. Particularly, in the present embodiment, the images representing statistical information are displayed to be arranged in association with respective measurement areas, making it possible to compare the staying state of persons in one measurement area to that in another measurement area easily.

Still further, in the present embodiment, the statistical information is expressed by an attribute(s) of the image representing statistical information, such as the size, tint and darkness, and thus, it is possible to grasp the magnitude of the numerical value of the statistical information at a glance. Particularly, by expressing multiple kinds of statistical information with different attributes of an image, a single image can express multiple kinds of statistical information, whereby in a case where images representing statistical information are displayed superimposed on the image including the measurement areas, the resulting display screen (display image) can be easier to view.

Still further, in the present embodiment, a stay duration and a number of staying persons are output as the statistical information, and this makes it possible to grasp the staying state of persons in the measurement area more in detail.

Particularly, in the present embodiment, the stay duration and the number of staying persons are expressed by two attributes (size and color) of an image, and thus, the stay duration and the number of staying persons can be grasped at a glance.

Figure 15:
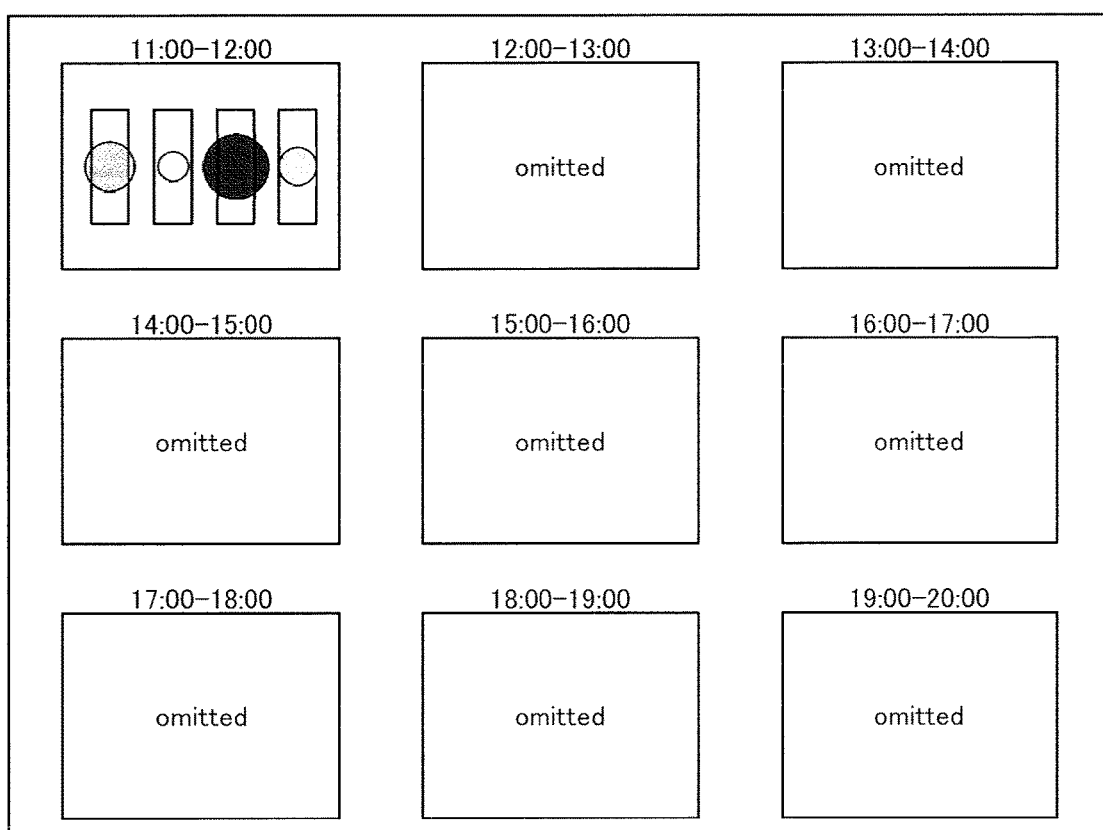
FIG. 15 is an explanatory diagram for explaining an example in which sets of statistical information obtained under different conditions are displayed side by side.

Next, a description will be given of an example in which sets of statistical information obtained under different conditions are displayed side by side. FIG. 15 is an explanatory diagram for explaining such an example.

It is to be noted that, in FIG. 15, the images representing statistical information are shown for only one time slot (11 o'clock to 12 o'clock) and showing of the images statistical information is omitted for the other time slots, though the images representing statistical information are similarly shown in these time slots also. It is also to be noted that the way of displaying statistical information is the same as that in the example shown in FIG. 14.

In the example shown in FIG. 15, sets of statistical information (stay duration and number of staying persons) for respective time slots (unit times) are displayed to be arranged in chronological order. In this case, the statistical processing unit 31 performs a process of generating the statistical information for each time slot by averaging pieces of statistical information at time points belonging to the time slot, and the screen generation unit 32 performs a process of generating screen information for displaying sets of statistical information for respective time slots in chronological order.

As described above, in the present embodiment, the stay duration and the number of staying persons of each time slot are output such that the sets of information for respective time slots are arranged in chronological order, and this makes it possible to grasp the temporal change in the stay duration and the number of staying persons at a glance and to compare the staying states in different time slots easily.

It is to be noted that, in the example shown in FIG. 15, the statistical information is displayed on the hourly basis, but the unit time is not limited to one hour, and the statistical information may be displayed in minutes, or on the basis of morning, midday and evening periods. Further, when the statistical information is displayed in the form of a table as shown in FIG. 13, it is possible to display the sets of statistical information for respective time slots to be arranged side by side as in the example shown in FIG. 15.

Next, a description will be given of an example in which a difference between sets of statistical information obtained under different conditions is displayed. FIG. 16 is an explanatory diagram for explaining such an example. It is to be noted that the way of displaying the statistical information is the same as in the example shown in FIG. 14.

In the example shown in part (A) in FIG. 16, a difference between sets of statistical information of the same store obtained for two different time slots are displayed, where the two time slots correspond to the different conditions. Particularly, in this example, a difference between morning and evening time slots (11:00 to 12:00 and 19:00 to 20:00) is displayed, making it possible to see the staying state in the morning time slot (11:00 to 12:00) relative to that in the evening time slot (19:00 to 20:00).

In the example shown in part (B) in FIG. 16, a difference between sets of statistical information obtained for two different stores in the same time slot is displayed, where the two stores correspond to the different conditions. Particularly, in this example, a difference obtained by subtracting the statistical information of the store B from the statistical information of the store A, both being obtained in the same time slot (12:00 to 13:00) is displayed, and thus, it is possible to see the staying state in the store A relative to that in the store B.

In the example shown in part (C) in FIG. 16, a difference between sets of statistical information obtained in the same time slot for two sets of measurement areas respectively corresponding to two different cameras mounted at different positions in the same store is displayed, where the two cameras (or two sets of measurement areas) correspond to the different conditions. Particularly, in this example, a difference obtained by subtracting the statistical information relating to the measurement areas covered by the camera B mounted at one position in the store A from the statistical information relating to the measurement areas covered by the camera A mounted at another position in the store A, both being obtained in the same time slot (12:00 to 13:00), is displayed, and thus, it is possible to see the staying state in the measurement areas covered by the camera A relative to that in the measurement areas covered by the camera B.

In each of the examples shown in FIG. 16, the statistical processing unit 31 performs obtaining a difference between sets of statistical information (stay duration and number of staying persons) obtained under different conditions, and the screen generation unit 32 performs a process of generating screen information for displaying the difference between the sets of statistical information obtained by the statistical processing unit 31.

It is to be noted that the difference between sets of statistical information obtained under different conditions may be displayed in the form of a table, as in the example shown in FIG. 13.

As described above, in the present embodiment, a difference between sets of statistical information obtained under different conditions is output, and this makes it possible to understand the difference between staying states of persons under different conditions at a glance.

Specifically, in the example shown in part (A) in FIG. 16, it is possible to see the difference between staying states of customers in two different time slots at a glance, and thus, information useful in discussing improvement measures to be taken in each time slot can be obtained. In the example shown in part (B) in FIG. 16, it is possible to see the difference between staying states of customers in two different stores at a glance, and thus, information useful in discussing improvement measures to be taken in each store can be obtained. In the example shown in part (C) in FIG. 16, it is possible to see the difference between staying states at different sets of checkout counters located at different positions in the store at a glance, and thus, information useful in discussing improvement measures for each set of checkout counters, for example, an improvement in guiding customers during a crowded time, can be obtained.

Next, a description will be given of other modes of representing statistical information as images. FIGS. 17A to 17E are explanatory diagrams showing such examples.

In the example shown in FIG. 14, image 43 representing statistical information were displayed superimposed on the image 41 taken by the camera 1 to include the measurement areas, and particularly, the statistical information (stay duration and number of staying persons) was expressed by the images 43 each consisting of a circular figure. However, each image 43 representing statistical information may be any image constituted of at least one of a figure, a character and a symbol. Also, a figure other than a circle, such as a square, may be used as the image 43. Each image 43 representing statistical information may be embodied as an image other than a figure, such as a symbol(s) or a character(s).

Further, in the example shown in FIG. 14, the length of the stay duration was expressed by the darkness of the fill color of the image 43 and the number of staying persons was expressed by the size of the image 43. However, the magnitude of a numerical value of the statistical information may be expressed by any attribute of the image 43 representing statistical information; specifically, by any of the size of the image 43, the fill color of the image 43, the tint and darkness of the color of the contour line of the image 43 and thickness of the contour line.

Figure 17A:
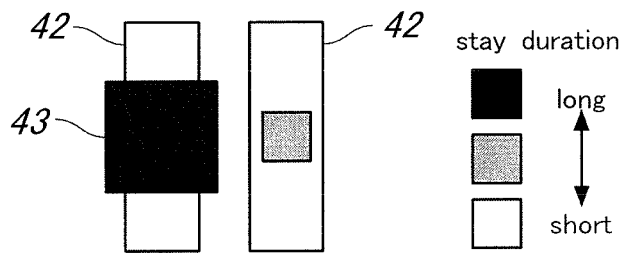
FIGS. 17A to 17E are explanatory diagrams showing other examples of modes of representing statistical information as images.
Figure 17B:
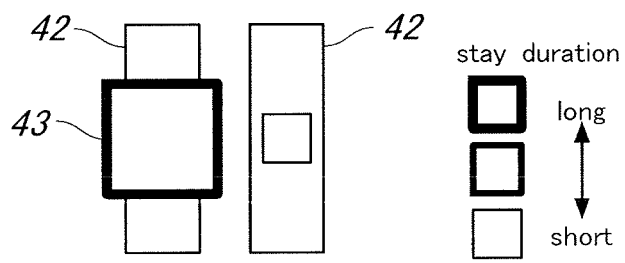
Figure 17C:
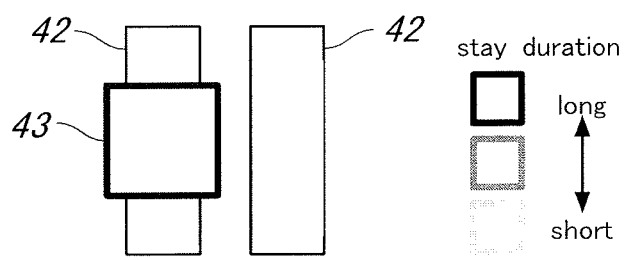

For instance, in the examples shown in FIGS. 17A, 17B and 17C, the images 43 representing statistical information each consist of a square. Particularly, in the example shown in FIG. 17A, the length of the stay duration is expressed by the darkness of the fill color of the square, in the example shown in FIG. 17B, the length of the stay duration is expressed by the thickness of the contour line of the square, and in the example shown in FIG. 17C, the length of the stay duration is expressed by the darkness of the color of the contour line of the square. Further, in the examples shown in FIGS. 17A, 17B and 17C, the number of staying persons is expressed by the size of the square. It is to be noted that, in the examples shown in FIGS. 17A and 17C, the statistical information may be expressed by the tint instead of the darkness of the color.

Figure 17D:
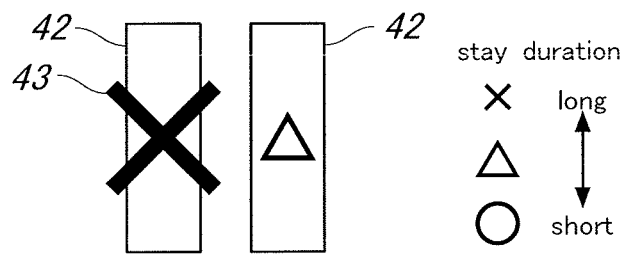
Figure 17E:
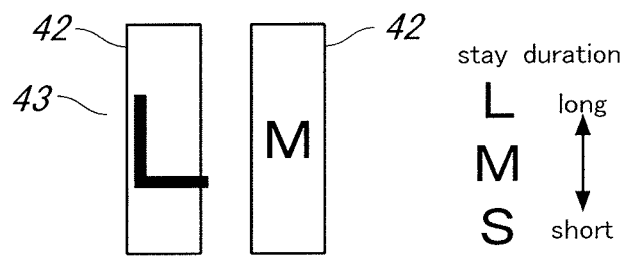

In the example shown in FIG. 17D, the images 43 representing statistical information are each embodied by a symbol. Specifically, in this example, the length of the stay duration is expressed by the kind of the symbol, and the number of staying persons is expressed by the size of the symbol. In the example shown in FIG. 17E, the images 43 representing statistical information are each embodied by a character. Specifically, in this example, the length of the stay duration is expressed by three alphabet letters (L, M, S) meaning large, medium and small, respectively, and the number of staying persons is expressed by the size of each character.

Next, a description will be given of other examples in which a movement line has a missing part in a measurement area. FIG. 18 is an explanatory diagram for explaining such examples.

In the foregoing embodiment, the model-based compensation process, in which a compensation time model is used to obtain a stay duration, was performed for the appearing pattern in which a movement line appears within a measurement area as shown in FIG. 8A and for the disappearing pattern in which a movement line disappears within a measurement area as shown in FIG. 9A. However, as shown in FIG. 18, there are a variety of patterns in which the movement line includes a missing part, and thus, a process suitable for a particular pattern in which the movement line includes a missing part should be performed, as described in the following.

In the example shown in part (A) in FIG. 18, after the movement line disappears within the measurement area, a movement line recognized as being of the same person appears within the measurement area. In this case, the movement line includes a missing part in the measurement area, but the time point of entry into the measurement area and the time point of exit from the measurement area, i.e., the time point at which the movement line crosses the measurement start line and the time point at which the movement line crosses the measurement end line, can be definitely determined, and thus, the actual measurement time Tm calculated based on these time points is used as a stay duration.

On the other hand, in the example shown in part (B) in FIG. 18, after appearing within the measurement area, the movement line disappears within the measurement area. In this case, there are grid cells that do not include a portion of the missing part in the movement line. Since the time points at which the moving line intersects the boundary lines of these grid cells can be definitely determined, by obtaining the actual measurement time Tm by use of these time points, the time period required to pass through the grid cells that do not include a portion of the missing part can be obtained. Of the sections upstream and downstream of the section corresponding to the actual measurement time Tm, for the section including the grid cell in which the movement line appeared, a compensation time Tc1 can be obtained by use of the compensation time model shown in FIG. 8B, and for the section including the grid cell in which the movement line disappeared, a compensation time Tc2 can be obtained by use of the compensation time model shown in FIG. 9B. Then, by adding together the actual measurement time Tm and the compensation times Tc1, Tc2, a stay duration can be obtained.

In the example shown in part (C) in FIG. 18, the movement line repeats appearance and disappearance in the measurement area. In the illustrated case, the time point at which the movement line crosses the boundary of a grid cell after the first appearance thereof and the time point at which the movement line crosses the measurement end line can be definitely determined, and from these time points, an actual measurement time Tm is obtained. For the section upstream of the section corresponding to the actual measurement time Tm, a compensation time Tc can be obtained by use of the compensation time model shown in FIG. 8B. Then, by adding together the actual measurement time Tm and the compensation time Tc, a stay duration can be obtained.

It is to be noted that, in the case where the pattern of appearance and disappearance of the movement line is reversed from that in the example shown in part (C) in FIG. 18 (namely, in the case of a pattern that is obtained by turning the diagram shown in part (C) in FIG. 18 upside down) also, the stay duration can be obtained with a similar procedure by use of the compensation time model shown in FIG. 9.

In the example shown in part (D) in FIG. 18, similarly to the example shown in part (C) in FIG. 18, the movement line repeats appearance and disappearance in the measurement area. Based on the time points at which the movement line crosses the boundary lines of grid cells, the actual measurement time Tm can be obtained. Further, for the sections upstream and downstream of the section corresponding to the actual measurement time Tm, similarly to the example shown in part (B) in FIG. 18, compensation times Tc1, Tc2 can be obtained by use of the compensation time model shown in FIG. 8B and FIG. 9B, respectively. Thus, by adding together the actual measurement time Tm and the compensation times Tc1, Tc2, a stay duration can be obtained.

As described above, in the case where there are multiple points at which the movement line crosses the measurement start line and/or measurement end line and/or boundary lines of grid cells upstream or downstream of a missing part, an actual measurement time required to move between any two of these points can be obtained even if a missing part exists therebetween, and by use of this actual measurement time, a stay duration can be obtained.

In the foregoing, the present invention has been described in terms of concrete embodiments thereof. However, these embodiments are provided for illustrative purposes and the present invention is not limited by the embodiments. It is also to be noted that not all of the structural elements of the stay duration measurement device, the stay duration measurement system and the stay duration measurement method as shown in the embodiments of the present invention are not necessarily indispensable, and they may be selectively used as appropriate without departing from the spirit of the present invention.

For instance, in the foregoing embodiment, measurement areas were set to correspond to the checkout counters in retail stores such as a supermarket, but the measurement areas may be set at any place where a queue(s) may be formed, such as an ATM corner in a bank, an entrance gate or a reception desk of a site of an event, exhibition, etc., or an area in front of an exhibition panel, exhibition booth or the like.

Further, in the foregoing embodiment, a description was made of an example in which the moving objects for which a stay duration is measured were persons. However, the moving objects may be other than persons. For example, in a case where the moving objects are vehicles such as cars, bicycles or the like, the present invention may be used to grasp the staying state of the vehicles entering a parking lot.

Further, in the foregoing embodiment, the compensation time model generation unit 27 was configured to generate a compensation time model based on movement lines that do not include a missing part. However, even with a movement line including a missing part, the part of the movement line other than the missing part can be used to determine the time point at which the movement line passes a grid cell, and therefore, it is also possible to use movement lines including a missing part in the process of generating a compensation time model.

Further, in the foregoing embodiment, a description was made of an example in which multiple compensation time models were generated for respective time slots. However, multiple compensation time models may be generated for various conditions other than time slots, such as respective days of a week. Particularly, in the batch generation mode in which one or more compensation time models are generated based on the movement line information obtained for a certain period of time, a large number of samples of movement lines are obtained, and thus, compensation time models for various conditions can be generated.

Further, in the foregoing embodiment, the moving object tracking device 4 was provided separately from the camera 1, but a part or the entirety of the functions of the moving object tracking device 4 may be incorporated into the camera 1 to constitute an imaging device having a moving object tracking function. Further, the various units of the PC 3, such as the movement line obtaining unit 22, may be incorporated into the camera 1. It is also possible to realize the moving object tracking device 4 in the PC 3.

Further, in the foregoing embodiment, the moving object tracking process and the stay duration measurement process were performed by a device set up at the store, but these processes may be performed by the PC 11 set up at the management office or a cloud computer 12 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN. Thereby, the multiple information processing devices jointly executing the necessary processes constitute a stay duration measurement system.

In this case, it is preferred that the device set up at the store be configured to perform at least the moving object detection process and the movement line obtaining process. In such a structure, since the information obtained by the moving object detection process and the movement line obtaining process has a small amount of data, even if the remaining processes are performed by an information processing device set up at a place other than the store, such as the PC 11 disposed at the management office, the communication load can be small, and thus, it is easy to operate the system in the form of a wide area network.

It may be also preferred that the cloud computer 12 be configured to perform at least the moving object detection process and the movement line obtaining process. In such a structure, although the moving object detection process and the movement line obtaining process require a large amount of computation, they are achieved by the information processing device constituting a cloud computing system, and therefore, it is not necessary to prepare a high-speed information processing device on the user side, namely at the store or the like. Further, since the remaining processes require a small amount of computation, the remaining processes can be performed as extended functions of an information processing device set up at the store to serve as a sales information management device, and this can reduce the cost born by the user.

The cloud computer 12 may be configured to perform the entirety of the necessary processes or may be configured to perform, of the necessary processes, at least the process of outputting the result of the statistical processing of the stay duration. In such a structure, it becomes possible to view the staying state on a mobile terminal such as a smartphone 13 in addition to the PC 3 set up at the store and the PC 11 set up at the management office, and this allows a user to view the staying state not only at the store or the management office but also at any other place, such as a place the user is visiting on business.

Further, in the foregoing embodiment, the result of the statistical processing of the stay duration was output on the monitor 7 of the PC 3 disposed at the store, but a browser device for viewing the result of the statistical processing may be provided separately from the PC 3. For example, it is possible to use the PC 11 disposed at the management office or the smartphone 13 described above as a browser device for viewing the result of the statistical processing. Besides, it is also possible to add the function of the browser device for viewing the result of the statistical processing to a sales information management device disposed at the store. The result of the statistical processing may be output from a printer.

The stay duration measurement device, stay duration measurement system and stay duration measurement method according to the present invention can obtain, even for a moving object whose movement line in a measurement area is incomplete, a stay duration comparable to that which would be obtained if the movement line in the measurement area were complete, and thus, are useful as a stay duration measurement device, a stay duration measurement system and a stay duration measurement method for measuring a stay duration in a measurement area for each moving object such as a person.

The invention claimed is:

1. A stay duration measurement device comprising:
a processor; and
a memory storing instructions,
wherein the processor, when executing the instructions stored in the memory, performs operations comprising:
obtaining a movement line of each moving object of a plurality of moving objects detected from images including a measurement area;
determining whether the obtained movement line of a moving object of interest of the plurality of moving objects includes a missing part in the measurement area; and
obtaining, when it is determined that the movement line of the moving object of interest includes a missing part in the measurement area, a stay duration of the moving object of interest in the measurement area, by compensating for the missing part based on at least one time period required for movement in the measurement area by at least one moving object of the plurality of moving objects other than the moving object of interest,
wherein, in the determining, the movement line is determined as including a missing part in the measurement area, when the movement line crosses only one or none of a measurement start line and a measurement end line defined on a boundary of the measurement area in the images,
wherein the processor, when executing instructions stored in the memory, further performs operations comprising:
cumulatively storing, in a memory, stay durations obtained for the plurality of moving objects,
performing temporal statistical processing on the stay durations obtained for the plurality of moving objects and cumulatively stored in the memory, to generate statistical information; and
outputting information including the statistical information.

2. The stay duration measurement device according to claim 1, wherein the processor, when executing the instructions stored in the memory, further performs operations comprising:
collecting time periods required for movements of the plurality of moving objects in the measurement area, and
generating a learning model in which compensation times are set such that a compensation time for a missing part in a movement line is determined based on a position of the missing part,
wherein, according to the learning model, a compensation time for the moving object of interest is obtained based on the position of the missing part in the movement line of the moving object of interest, and the stay duration for the moving object of interest is obtained by compensating for the missing part by use of the obtained compensation time.

3. The stay duration measurement device according to claim 2, wherein:
it is determined whether the movement line of the moving object of interest is an appearing pattern, in which the movement line starts within the measurement area;
a learning model for the appearing pattern is generated in which time periods required to move from entry into the measurement area to multiple positions in the measurement area are set as the compensation times; and
in response to determining that the movement line of the moving object of interest is the appearing pattern, according to the learning model for the appearing pattern, the compensation time for the moving object of interest is obtained based on a start position of the movement line of the moving object of interest.

4. The stay duration measurement device according to claim 2, wherein:
it is determined whether the movement line of the moving object of interest is a disappearing pattern, in which a movement line ends within the measurement area;
a learning model for the disappearing pattern is generated in which time periods required to move from multiple positions in the measurement area to exit from the measurement area are set as the compensation times; and
in response to determining that the movement line of the moving object of interest is the disappearing pattern, according to the learning model for the disappearing pattern, the compensation time for the moving object of interest is obtained based on an end position of the movement line of the moving object of interest.

5. The stay duration measurement device according to claim 2, wherein:
the measurement area is divided into a plurality of division areas;
the time periods required for movements of the plurality of moving objects in the measurement area are collected on the basis of the plurality of division areas and the learning model is generated such that a compensation time is set for each division area; and
according to the learning model, the compensation time for the moving object of interest is obtained based on a position of at least one division area in which the missing part is present.

6. The stay duration measurement device according to claim 2, wherein:
a learning model is generated for each time slot; and
the compensation time for the moving object of interest is obtained according to the learning model for a time slot in which the moving object of interest was detected.

7. The stay duration measurement device according to claim 1, wherein the stay duration of the moving object of interest whose movement line is determined to include a missing part in the measurement area is replaced with a stay duration of a moving object of the plurality of moving objects other than the moving object of interest, whose movement line is determined not to include a missing part in the measurement area.

8. The stay duration measurement device according to claim 7, wherein the stay duration of the moving object of interest whose movement line is determined to include a missing part in the measurement area is replaced with a stay duration of a moving object which, of at least one moving object of the plurality of moving objects other than the moving object of interest, whose movement line is determined not to include a missing part in the measurement area, is temporally closest to the moving object of interest whose movement line is determined to include a missing part.

9. The stay duration measurement device according to claim 1, wherein output information relating to a display image is generated, the display image including at least one image representing the statistical information superimposed on an image including the measurement area, and the display image is displayed on a monitor.

10. The stay duration measurement device according to claim 9, wherein, in the display image, a magnitude of a numerical value of the statistical information is expressed by at least one of a size, tint and darkness of the at least one image representing the statistical information.

11. The stay duration measurement device according to claim 1, wherein:
stay durations for multiple unit times are obtained as the statistical information based on the stay durations obtained for the plurality of moving objects; and
output information is generated in which the stay durations for the multiple unit times are arranged in chronological order.

12. The stay duration measurement device according to claim 1, wherein:
a difference between sets of statistical information obtained under different conditions is obtained; and
output information including the difference between the sets of statistical information is generated.

13. The stay duration measurement device according to claim 1, wherein the statistical information includes, in addition to the stay durations, a number of moving objects staying in the measurement area simultaneously.

14. A stay duration measurement system comprising:
a camera that captures images of a region including a measurement area; and
a plurality of processors,
wherein the plurality of processors jointly performs operations comprising:
detecting a plurality of moving objects from the images captured by the camera and outputting detection position information of the plurality of moving objects;
obtaining a movement line of each moving object of the plurality of moving objects based on the detection position information;
determining whether the obtained movement line of a moving object of interest of the plurality of moving objects includes a missing part in the measurement area; and
obtaining, when it is determined that the movement line of the moving object of interest includes a missing part in the measurement area, a stay duration of the moving object of interest in the measurement area, by compensating for the missing part based on at least one time period required for movement in the measurement area by at least one moving object of the plurality of moving objects other than the moving object of interest,
wherein, in the determining, the movement line is determined as including a missing part in the measurement area, when the movement line crosses only one or none of a measurement start line and a measurement end line defined on a boundary of the measurement area in the images,
wherein the plurality of processors further jointly performs operations comprising:
cumulatively storing, in a memory, stay durations obtained for the plurality of moving objects,
performing temporal statistical processing on the stay durations obtained for the plurality of moving objects and cumulatively stored in the memory, to generate statistical information; and
outputting information including the statistical information.

15. A stay duration measurement method comprising:
obtaining a movement line of each moving object of a plurality of moving objects detected from images including a measurement area;
determining whether the obtained movement line of a moving object of interest of the plurality of moving objects includes a missing part in the measurement area; and
in response to determining that the movement line of the moving object of interest includes a missing part in the measurement area, obtaining a stay duration of the moving object of interest in the measurement area, by compensating for the missing part based on at least one time period required for movement in the measurement area by at least one moving object of the plurality of moving objects other than the moving object of interest,
wherein, in the determining, the movement line is determined as including a missing part in the measurement area, when the movement line crosses only one or none of a measurement start line and a measurement end line defined on a boundary of the measurement area in the images,
wherein at least one of the obtaining a movement line, the determining whether the movement line includes a missing part in the measurement area, and the obtaining a stay duration is performed by a processor,
wherein the method further comprising:
cumulatively storing, in a memory, stay durations obtained for the plurality of moving objects,
performing temporal statistical processing on the stay durations obtained for the plurality of moving objects and cumulatively stored in the memory, to generate statistical information; and
outputting information including the statistical information.

* * * * *